US009575806B2

(12) United States Patent
Wang et al.

(10) Patent No.: US 9,575,806 B2
(45) Date of Patent: Feb. 21, 2017

(54) MONITORING ACCESSES OF A THREAD TO MULTIPLE MEMORY CONTROLLERS AND SELECTING A THREAD PROCESSOR FOR THE THREAD BASED ON THE MONITORING

(75) Inventors: Ren Wang, Portland, OR (US); Ling Ma, Shang Hai (CN); Ahmad Samih, Beaverton, OR (US); Zhaojuan Bian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 13/538,971

(22) Filed: Jun. 29, 2012

(65) Prior Publication Data
US 2014/0007114 A1    Jan. 2, 2014

(51) Int. Cl.
*G06F 9/46* (2006.01)
*G06F 9/50* (2006.01)

(52) U.S. Cl.
CPC ....... *G06F 9/5027* (2013.01); *G06F 2209/501* (2013.01); *G06F 2209/502* (2013.01); *Y02B 60/142* (2013.01)

(58) Field of Classification Search
None
See application file for complete search history.

(56) References Cited

U.S. PATENT DOCUMENTS 5,592,612 A *  1/1997  Birk .............................. 714/6.24
5,727,167 A *  3/1998  Dwyer .......................... 710/100
6,157,621 A * 12/2000  Brown .................... H01Q 1/242
                                                   370/310
7,865,686 B2 *  1/2011  Akimoto ....................... 711/170
7,957,427 B2 *  6/2011  Slutsman ............ H04L 43/0852
                                                   370/238
8,196,147 B1 *  6/2012  Srinivasan et al. ........... 719/310
(Continued)

FOREIGN PATENT DOCUMENTS

WO    2014/004007 A2    1/2014
WO    2014/004007 A3    3/2014

OTHER PUBLICATIONS

Awasthi, M., et al., "Managing Data Placement in Memory Systems with Multiple Memory Controllers", *Int. J. Parallel Prog.* (2012); Published online Aug. 7, 2011, pp. 57-83.
(Continued)

*Primary Examiner* — Benjamin Wu
*Assistant Examiner* — James J Lee
(74) *Attorney, Agent, or Firm* — Vecchia Patent Agent, LLC

(57) ABSTRACT

A method of an aspect includes running a plurality of threads on a plurality of thread processors. Memory accesses, of a thread of the plurality that is running on a first thread processor of the plurality, are monitored to both a first memory through a first memory controller and a second memory through a second memory controller. A second thread processor of the plurality is selected for a thread based on the monitoring of the memory accesses of the thread to both the first memory and the second memory. Installation of the thread, for which the second thread processor was selected, is initiated on the second thread processor. Other methods, apparatus, and systems are also disclosed.

21 Claims, 15 Drawing Sheets

(56) References Cited

U.S. PATENT DOCUMENTS

| | | | | |
|---|---|---|---|---|
| 8,381,004 | B2* | 2/2013 | Elnozahy | G06F 1/3203 713/320 |
| 8,656,397 | B2* | 2/2014 | Eidus et al. | 718/102 |
| 8,924,975 | B2* | 12/2014 | Memik | G06F 9/4843 702/186 |
| 2002/0049824 | A1* | 4/2002 | Wilson | 709/213 |
| 2002/0147760 | A1 | 10/2002 | Torii | |
| 2005/0044319 | A1 | 2/2005 | Olukotun | |
| 2006/0005082 | A1* | 1/2006 | Fossum | G06F 1/3203 714/42 |
| 2007/0101332 | A1 | 5/2007 | Courchesne et al. | |
| 2007/0204267 | A1* | 8/2007 | Cole et al. | 718/100 |
| 2008/0059712 | A1* | 3/2008 | Fedorova | G06F 9/4881 711/130 |
| 2008/0134191 | A1 | 6/2008 | Warrier et al. | |
| 2008/0196030 | A1* | 8/2008 | Buros et al. | 718/102 |
| 2009/0235262 | A1* | 9/2009 | Ceze et al. | 718/102 |
| 2009/0296668 | A1* | 12/2009 | Capone | H04W 72/1257 370/337 |
| 2011/0145545 | A1* | 6/2011 | Hunter et al. | 712/30 |
| 2011/0154352 | A1* | 6/2011 | Desota et al. | 718/104 |
| 2011/0197195 | A1 | 8/2011 | Cai et al. | |
| 2011/0247000 | A1* | 10/2011 | Eidus et al. | 718/104 |
| 2011/0258420 | A1* | 10/2011 | Devadas | G06F 9/3824 712/225 |
| 2012/0102500 | A1* | 4/2012 | Waddington | G06F 9/5061 718/104 |
| 2013/0170342 | A1* | 7/2013 | Alnuem | H04L 47/25 370/230 |
| 2014/0149766 | A1* | 5/2014 | Samih | H04L 45/06 713/320 |

OTHER PUBLICATIONS

Becchi, M., et al., "Dynamic Thread Assignment on Heterogeneous Multiprocessor Architectures", *Journal of Instruction-Level Parallelism 10* (2008), pp. 1-26.

Chaparro, P., et al., "Thermal-Effective Clustered Microarchitectures", *In Proc. of the First Workshop on Temperature-Aware Computer Systems* Jun. 2004. pp. 1-9.

Constantinou, T., et al., "Performance Implications of Single Thread Migration on a Chip Multi-Core", *Computer Architecture Research Group, dasCMP*, Barcelona Nov. 13, 2005. pp. 1-51.

Das, R., et al., "Application-to-Core Mapping Policies to Reduce Interference in On-Chip Networks" *SAFARI Technical Report* No. 2011-001 (May 25, 2011), pp. 1-23.

Kumar, R., et al., "Single-ISA Heterogeneous Multi-Core Architectures: The Potential for Processor Power Reduction", *In Proceedings of the 36th International Symposium On Microarchitecture* Dec. 2003, pp. 1-12.

Misler, M. et al., "Moths: Mobile Threads for On-Chip Networks", *PACT' 10*, Sep. 11-15, 2010 Vienna, Austria. pp. 541-542.

Strong, R., et al., "Fast Switching of Threads Between Cores", To appear in *ACM SIGOPS Operating Systems Review* special issue on, "*The Interaction Among the OS, the Compiler, and Multicore Processors*", Apr. 2009, vol. 43, No. 2, pp. 1-11.

"Notification of Transmittal of the International Search Report and the Written Opinion of the International Searching Authority, or the Declaration" mailing date, Dec. 19, 2013 pp. 11, in PCT/US2013/044350.

International Preliminary Report on Patentability and Written Opinion received for PCT Patent Application No. PCT/US2013/044350, mailed on Jan. 8, 2015, 7 pages.

\* cited by examiner

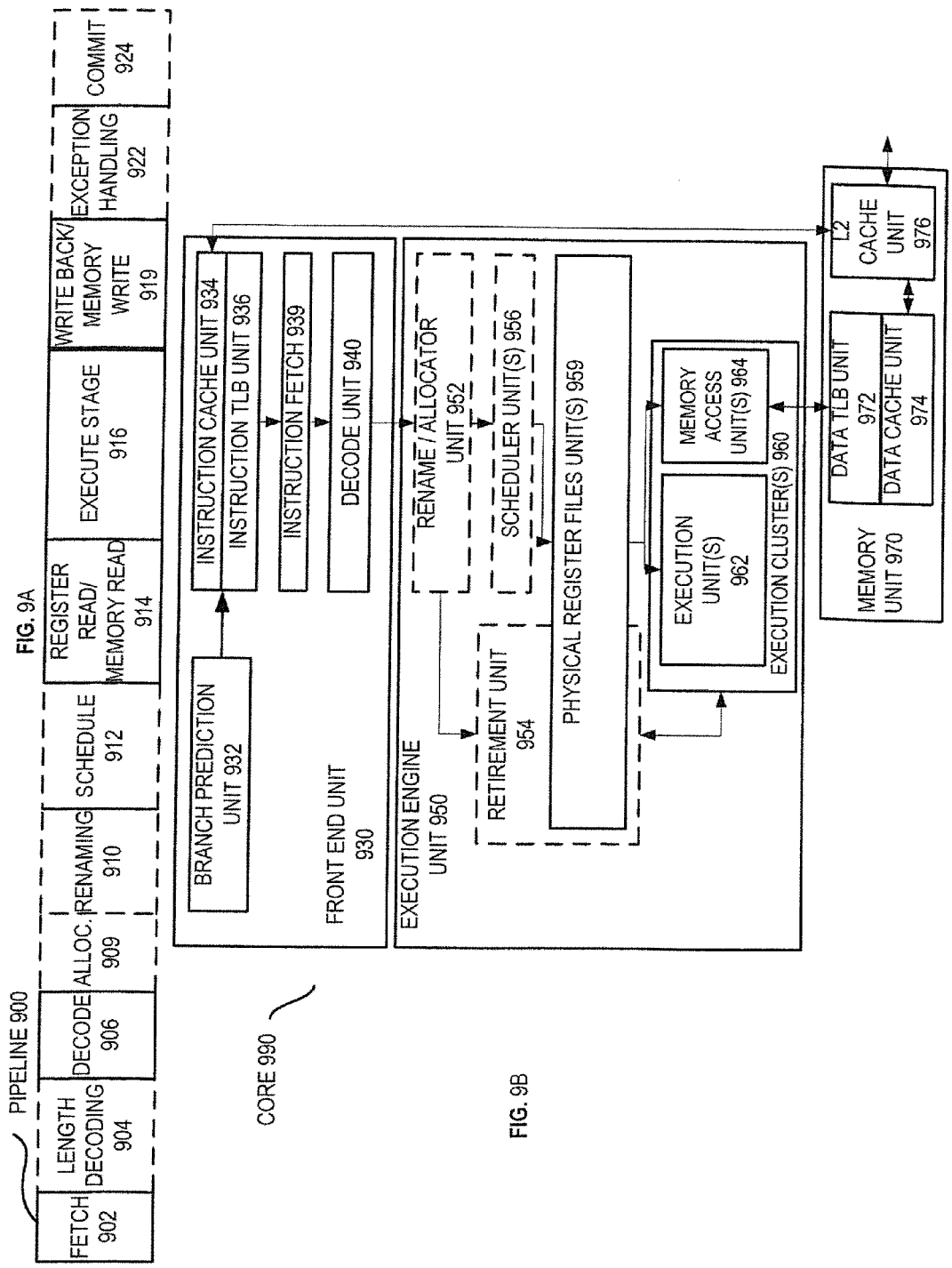

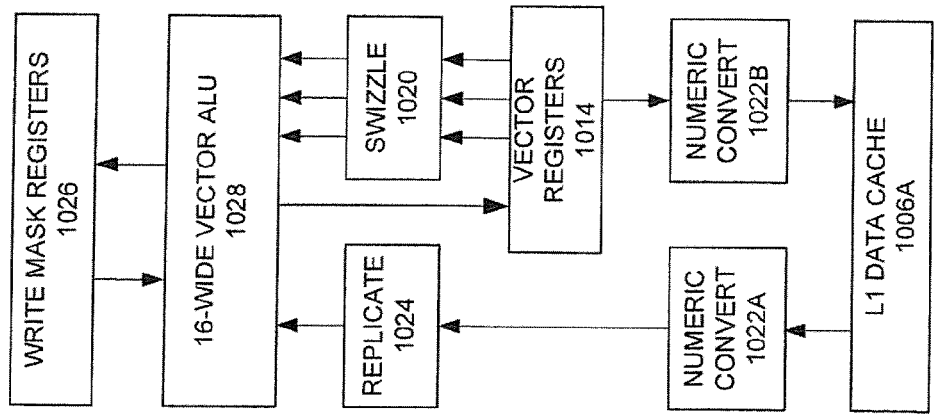
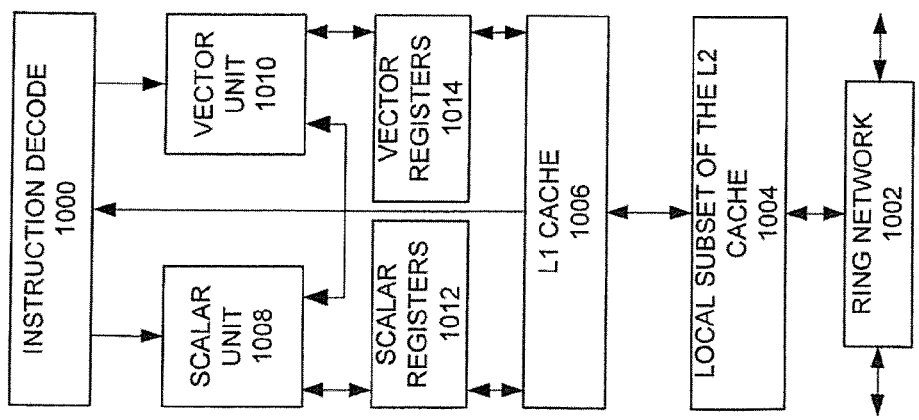

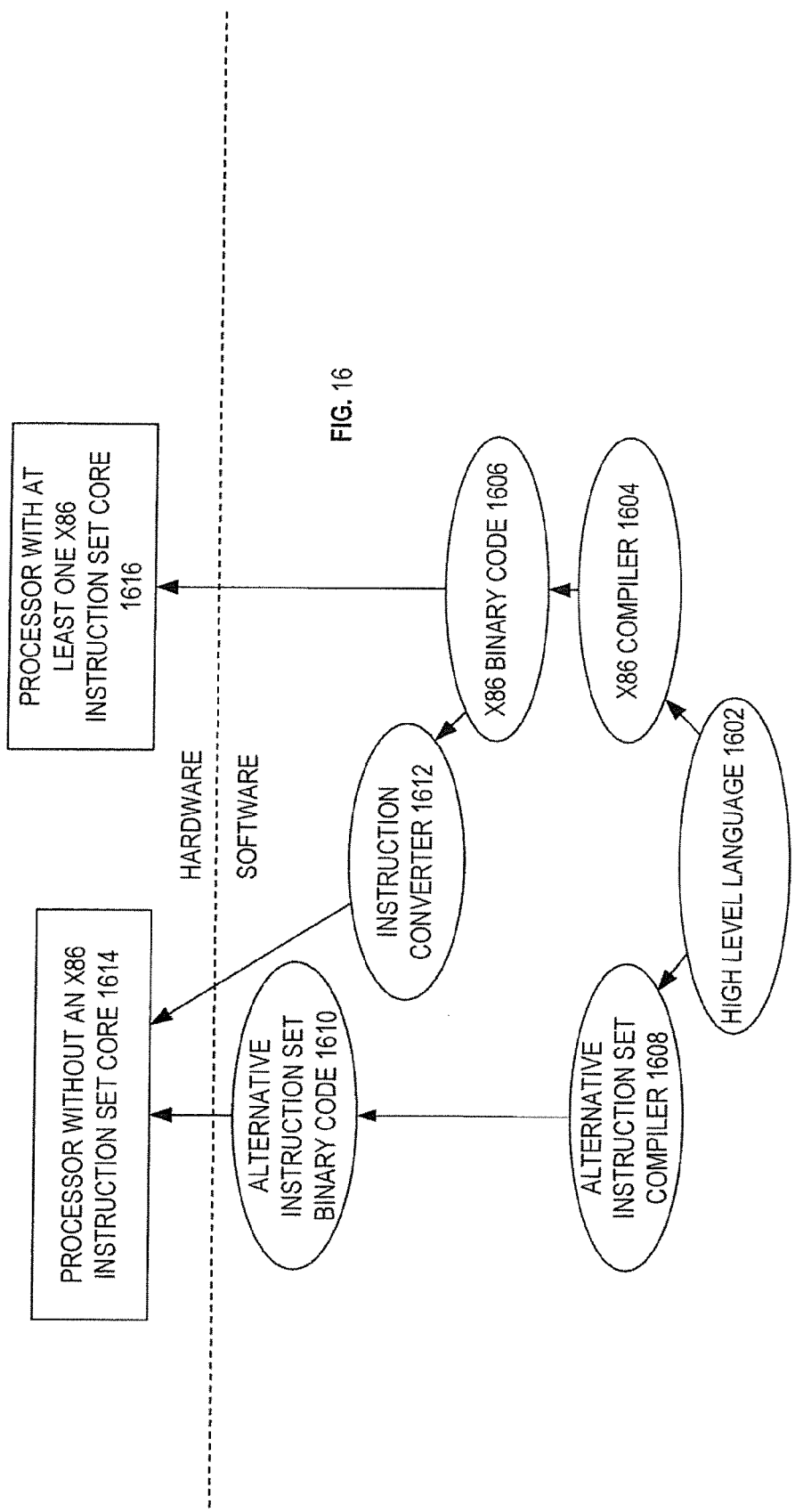

US 9,575,806 B2

MONITORING ACCESSES OF A THREAD TO MULTIPLE MEMORY CONTROLLERS AND SELECTING A THREAD PROCESSOR FOR THE THREAD BASED ON THE MONITORING

BACKGROUND

Field

Embodiments relate to software threads. In particular, embodiments relate to threads that access multiple memory controllers.

Background Information

Software is commonly executed as multiple software threads or threads. Commonly, multiple thread processors, each operable to process one or more threads, are included in a device so that multiple threads may be processed concurrently. This helps to increase processing throughput and/or reduce processing time. An operating system typically schedules each thread for processing on a thread processor at the time when the threads are first activated.

Commonly, during operation the threads running on the different thread processors may access data in a shared memory. For example, a thread running on a thread processor may access the shared memory when desired data is not found in a local cache or other local memory. Often, the threads access the shared memory through a shared memory controller that is directly connected to the shared memory.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIG. 10A is a block diagram of a single processor core, along with its connection to the on-die interconnect network 1002 and with its local subset of the Level 2 (L2) cache 1004, according to embodiments of the invention.

FIG. 10B is an expanded view of part of the processor core in FIG. 10A according to embodiments of the invention.

FIG. 16 is a block diagram contrasting the use of a software instruction converter to convert binary instructions in a source instruction set to binary instructions in a target instruction set according to embodiments of the invention.

DETAILED DESCRIPTION

In the following description, numerous specific details, such as, for example, specific apparatus, specific types and interrelationships of system components, logic partitioning/integration details, specific sets of operations, specific equations, and the like, are set forth. However, it is understood that embodiments of the invention may be practiced without these specific details. In other instances, well-known circuits, structures and techniques have not been shown in detail in order not to obscure the understanding of this description.

Figure 1:
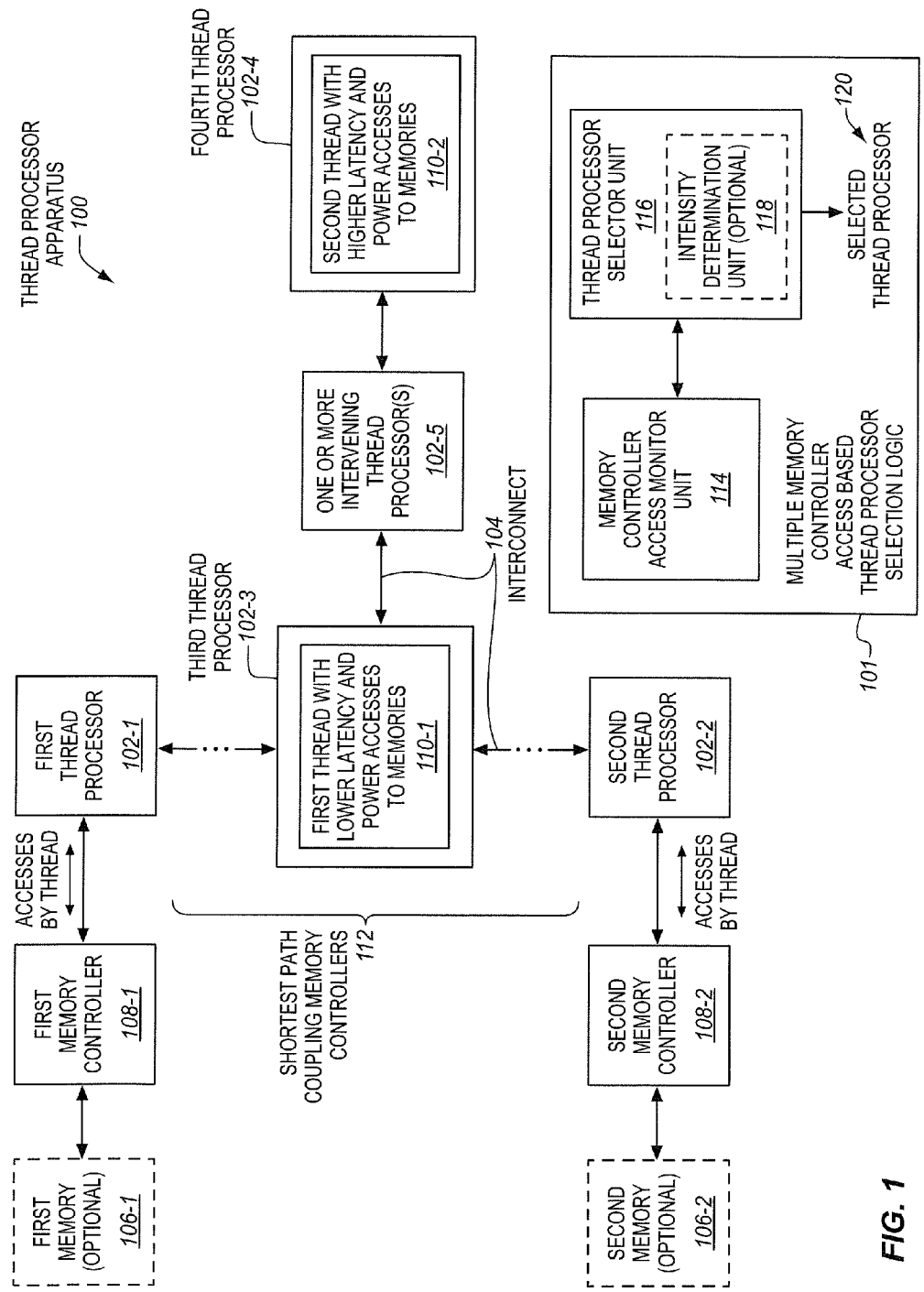
FIG. 1 is a block diagram of an embodiment of a thread processor apparatus having multiple memory controller access based thread processor selection logic that is operable to select a thread processor for a thread based on accesses to multiple memory controllers.

FIG. 1 is a block diagram of an embodiment of a thread processor apparatus 100 having multiple memory controller access based thread processor selection logic 101 that is operable to select a thread processor for a thread based on accesses to multiple memory controllers. The apparatus includes a first thread processor 102-1, a second thread processor 102-2, a third thread processor 102-3, a fourth thread processor 102-4, and one or more intervening thread processor(s) 102-5 that are coupled between the third and fourth thread processors. Other embodiments may include either fewer or more thread processors. For example, various other embodiments may include three, four, more than five, at least eight, at least ten, at least sixteen, at least twenty, at least thirty-two, at least fifty, at least sixty-four, at least eighty, or more thread processors. The thread processors are coupled together by an interconnect 104.

Each thread processor may represent a hardware thread processor that includes circuitry (e.g., integrated circuitry) or other hardware that is capable of processing or running one or more threads. Each thread may represent a portion of software (e.g., a group of instructions) that can be processed separately from (e.g., independently from and/or concurrently with) other portions (e.g., threads). In some embodiments, the thread processors may represent cores or other processors of a single semiconductor substrate (e.g., an integrated circuit die) that are coupled together by an on-die or on-substrate interconnect (e.g., a mesh, torus, ring, etc.). In some embodiments, one or more or all of the thread processors may be multi-threaded. The multi-threaded thread processors may each be operable to switch between processing two or more threads. In some embodiments, one or more or all of the thread processors may be single-threaded. Each single-threaded thread processor may be operable to process a single thread.

Threads running on the thread processors may access data from a first shared memory 106-1 and a second shared memory 106-2. In the illustrated embodiment, a first memory controller 108-1 is directly coupled with the first thread processor 102-1. Likewise, a second memory controller 108-2 is directly coupled with the second thread processor 102-2. The first memory controller is operable to couple with, and provide access to, the first shared memory 106-1. The second memory controller is operable to couple with, and provide access to, the second shared memory 106-2. In the illustration, the memories are shown in dashed lines to indicate that they are not necessarily part of the apparatus, but rather may be system-level components included in a system in which the apparatus is deployed.

Threads running on thread processors other than the first thread processor access the first memory through the first memory controller, the directly coupled first thread processor, and any intervening thread processors that are coupled or disposed between the thread processors on which the threads are running and the first thread processor. Likewise, threads running on thread processors other than the second thread processor access the second memory through the second memory controller, the directly coupled second thread processor, and any intervening thread processors that are coupled or disposed between the thread processors running the threads and the second thread processor. Accesses to the memory controllers through such intervening thread processors generally tend to take more time (i.e., have greater access latencies) than accesses from the thread processor that is directly coupled with the memory controller. In general, the more intervening thread processors between the accessed memory controller and the thread processor running the thread, the greater the latency tends to be. Such increased latencies tend to reduce performance and are generally undesirable.

In addition, accesses to the memory controllers through such intervening thread processors generally tend to consume more power and/or generate more heat than accesses to the memory controllers from the thread processor that is directly coupled with the memory controller. In general, the more intervening thread processors between the accessed memory controller and the thread processor running the thread, the greater the power consumption and/or heat generation tends to be. The increased power consumption and/or heat generation may be due in part to the need to convey additional electrical signals (e.g., additional signaling) through additional structures (e.g., additional thread processors, additional interconnect lengths, etc.). Moreover, in some embodiments, one or more of the intervening thread processors may initially be in a relatively lower power mode (e.g., an idle mode, a sleep mode, a clock off mode, a clock gated mode, etc.), and may need to be transitioned to a relatively higher power mode in order to convey the access to the memory controller.

In some embodiments, a thread running on a thread processor may access at least two memories and/or at least two memory controllers. Without limitation, there are various possible reasons why the thread may access two or more memories and/or memory controllers. One possible reason is data sharing between multiple threads (e.g., a first thread primarily accessing a first memory may access data of a second thread in a second memory). Another possible reason is that data for a thread may be stored in multiple memories each directly coupled with a different memory controller. For example, a thread may need more memory space than a single memory is able to provide so the memory space may be spread across two or more different memories. Yet another possible reason is memory interleaving. Certain operating systems perform memory interleaving in which memory space is intentionally allocated across multiple memories, each directly coupled to a different memory controller, in order to help increase the overall memory access bandwidth.

If a thread that accesses at least two memories and/or at least two memory controllers is running on a thread processor that is unnecessarily farther removed from one or more of the at least two memories and/or at least two memory controllers than it need be, then this may tend to unnecessarily increase memory access latency (which may tend to reduce performance) and/or tend to unnecessarily increase energy consumption. For example, as shown in the illustration, a second thread 110-2 running on the fourth thread processor 102-4 would access the first and second memories 106 and/or the first and second memory controllers 108 with relatively higher latencies and/or relatively higher power consumption, whereas a first thread 110-1 running on the third thread processor 102-3 would access the first and second memories 106 and/or the first and second memory controllers 108 with relatively lower latencies and/or relatively lower power consumption. As shown, in some embodiments, the third thread processor 102-3 may be located or disposed along a shortest path 112 coupling the first and second memory controllers (e.g., an interconnect path most directly coupling the first and second memory controllers), whereas the fourth thread processor would need to additionally traverse the one or more intervening thread processors 102-5 to reach the third thread processor 102-3 and/or the shortest path 112. In some embodiments, the shortest path may include a first thread processor that is directly coupled to the first memory controller, a second thread processor that is directly coupled to the second memory controller, and multiple thread processors that are coupled most directly between the first and second thread processors. It is not required that the third thread processor be located or disposed along the shortest path but often this will provide the lowest access latencies. Especially for the relatively memory access intensive threads (e.g., the threads that access the memory controllers most frequently), such accesses through unnecessary intervening thread processors may tend to significantly reduce performance and/or increase power consumption.

Referring again to FIG. 1, the apparatus includes multiple memory controller access based thread processor selection logic 101 that is operable to select a thread processor for a thread based on accesses to multiple memory controllers. As used herein, multiple refers to at least two. In some embodiments, the logic 101 may include a memory controller access monitor unit 114. The memory controller access monitor unit is operable to monitor accesses (e.g., read and/or write accesses), by threads to both the first and second memory controllers. Different ways of monitoring the accesses are contemplated. In some embodiments, the memory controller access monitor unit may be operable to monitor a proportion of instructions processed by the thread that are cache misses (e.g., per-thread misses per thousand instructions) with respect to local caches of the thread processors. In other embodiments, embodiments, the memory controller access monitor unit may be operable to monitor a count of cycle stalls for the thread (e.g., a per-thread stall cycles hardware counter). Other ways of monitoring the accesses are also possible. In some embodiments, the memory controller access monitor unit may be operable to determine the relative proportions of accesses to the first and second memory controllers. The relative proportions may be expressed as percentages, fractions, ratios, total numbers of accesses to each of the first and second memory controllers, etc. As one specific example, the memory controller access monitor unit may be operable to monitor or determine that approximately 70% of the memory accesses of the second thread are to the first memory controller, whereas approximately 30% of the memory accesses of the second thread are to the second memory controller. In some embodiments, the memory controller access monitor unit may also monitor memory access latencies, queuing delays, and/or other parameters associated with accessing the memory controllers and/or memories.

In some embodiments, a shared memory controller access monitor unit may be coupled with all of the thread processors and operable to monitor the memory controller accesses of threads running on all of the thread processors. In other embodiments, the memory controller access monitor unit may be a distributed memory controller access monitor unit that includes a plurality of distributed memory controller access monitor units. In some embodiments, each of the distributed memory controller access monitor units may be a part of and/or coupled with a different corresponding one of the thread processors and operable to monitor the memory controller accesses of a thread running on the corresponding thread processor. In other embodiments, each of the distributed memory controller access monitor units may be coupled with two or more corresponding thread processors and operable to monitor the memory controller accesses of threads running on the corresponding thread processors. The memory controller access monitor unit may be implemented in hardware, firmware, software, or a combination thereof. In some embodiments, the memory controller access monitor unit includes at least some hardware (e.g., transistors and/or integrated circuitry).

Referring again to FIG. 1, a thread processor selector unit 116 is coupled with the memory controller access monitor unit 114. The thread processor selector unit is operable to select thread processors for threads based on the monitoring of the accesses by threads to both the first and second memory controller. The thread processor selector unit may be implemented in hardware, firmware, software, or a combination thereof. In some embodiments, the thread processor selector unit may be located on-die with a thread processor and may include at least some hardware (e.g., transistors and/or integrated circuitry), although this is not required. In other embodiments, the thread processor selector unit may be at least partly implemented as a part of an operating system.

In some embodiments, the thread processor selector unit may be operable to select a thread processor that takes into account the memory accesses to both the first and second memories and/or both the first and second memory controllers. In some embodiments, the thread processor may be selected to strike a balance between the times (e.g., memory access latencies) needed to access the memories and/or memory controllers and the relative proportions (e.g., the fractions or percentages) of accesses for a thread to the memories and/or memory controllers. For example, memory access latencies to the various memories and/or memory controllers may be weighted or otherwise emphasized based on the proportion of the accesses to these memories and/or memory controllers. In one aspect, the memory access latencies may represent the overall latencies from the time a thread processor attempts to obtain (e.g., fetch) the data until the data is provided to the thread processor. As one particular example, if a thread accesses a first memory 70% of the time and a second memory 30% of the time, then a thread processor on a direct path coupling the first and second memory controllers and approximately 70% of the way to the memory controller corresponding to the first memory may be selected.

In some embodiments, the thread processor selector unit may be operable to select a thread processor that has minimal, near minimal, optimal, or near optimal weighted average memory access latency to two or more memories and/or two or more memory controllers in which the weighted average memory access latency may weight or emphasize the memory access latencies to two or more memories and/or two or more memory controllers based on the proportions of accesses to the two or more memories and/or two or more memory controllers. In some embodiments, an overall or average memory access latency weighted based on the relative proportions of accesses from the selected thread processor may be better than that of a majority, a vast majority, almost all, or all other thread processors. Memory access latencies and proportions of accesses are not the only parameters that may be used to select a thread processor. In the above-mentioned embodiments, or other embodiments entirely, a thread processor may be selected based also or alternatively on queuing delays associated with accessing the first and second memories (e.g., a first queuing delay associated with accessing the first memory and a second queuing delay associated with accessing the second memory). In one aspect, the queuing delay may represent a cumulative queuing delay incorporating all of the queuing delays for all of the hops through the intervening thread processors as well as the queuing delay within the memory controller. Often, the largest proportion of the cumulative queuing delay is attributable to the memory controller. It is to be appreciated that in some embodiments, the selection of the thread processor may also be based on other factors, such as, for example, current workload of the thread processors, processing capabilities of the thread processors, putting two threads that communicate with one another closer together, instantaneous queuing delays associated with different thread processors, and various combinations of such parameters.

To further illustrate certain concepts, consider a detailed approach for selecting a thread processor. Assume that a thread accesses a first memory controller (MC1) and a second memory controller (MC2). Of the accesses to the first and second memory controllers, T % are to the first memory controller and (100−T) % are to the second memory controller. The thread has a first access latency (L1) to the first memory controller and a second access latency (L2) to the second memory controller. The thread has a first queuing delay (Q1) to the first memory controller and a second queuing delay (Q2) to the second memory controller. The queuing delays may be average queuing delays monitored during runtime. There is a minimum hop count (H), for example measured in number of intervening thread processors, which is needed to provide interconnect between the first and second memory controllers. Each hop of the minimum hop count may take a fixed number of cycles (C) to traverse. Let the parameter X represent the location of the selected thread processor in terms of hops along the minimum hop count away from the first memory controller (MC1). In other words, the location of the selected thread processor is X hops away from MC1 and (H−X) hops away from MC2. The location of the selected thread processor may be determined from the following equations:

$$\text{Weighted average access time to } MC1 = T*(L1+Q1+X*C) \quad \text{Equation 1}$$

$$\text{Weighted average access time to } MC2 = (100-T)*(L2+Q2+(H-X)*C) \quad \text{Equation 2}$$

In one embodiment, to determine the value of X, the weighted average time to access MC1 may be made equal to the weighted average time to access MC2. In some embodiments, T, L1, L2, Q1, Q2, and C are all known (e.g., estimated from runtime information), such that X is the only variable. Equations 1 and 2 may be solved for the value of X in order to select the thread processor at a given location along the minimum hop path between MC1 and MC2.

This is just one specific detailed example of a suitable approach for selecting a thread processor. Other embodiments may base the selection on either more or less information. For example, if queuing delay is not an important factor for the particular implementation, it may optionally be omitted. As yet another option, if either latency or queuing delay is regarded as more significant than the other for the particular implementation, then they may be emphasized accordingly in the equation (e.g., with a weighting factor). Various other factors may also optionally be considered as will be apparent to those skilled in the art and having the benefit of the present disclosure.

In some embodiments, the thread processor may be selected for the same thread for which the memory accesses were monitored and that thread may be migrated to the selected thread processor. In other embodiments, the thread processor may be selected for another instance (e.g., a subsequent instance) of the thread for which the memory accesses were monitored and the other instance of the thread may be scheduled on the selected thread processor. By way of example, information about the monitoring of the accesses to memory controllers may be stored or otherwise preserved for a thread of a particular type. When other instances of the thread of the particular type are to be run, the preserved information may be accessed, and the other instances of the thread of the particular type may be scheduled on thread processors selected based on the monitored accesses to the first and second memory controllers. The instances may represent subsequently run instances of the thread, multiple copies of the thread running concurrently, etc.

The thread processor selector unit may output or otherwise provide the selected thread processor 120. As will be explained further below, in some embodiments, another component may initiate installation of a thread on the selected thread processor and/or may install a thread on the selected thread processor. As used herein, installing a thread on a thread processor broadly encompasses either scheduling the thread on the thread processor, migrating the thread already installed on another thread processor to the thread processor, instantiating the thread on the thread processor, or otherwise configuring the thread for access to system resources (e.g., execution units, registers, etc.) of the thread processor. Advantageously, installing the thread on the selected thread processor may help to improve performance due to reduced latencies of accessing one or both of the memories. In the case of out-of-order execution, which is not required, multiple memory requests may be issued aggressively within the instruction window to improve hardware utilization and/or reduce stall time. The selected thread processor may help to balance memory access latencies to the different memories so that none of them, especially the ones most frequently accessed, are unbalanced and/or excessively large relative to others. This may help to avoid an excessively slow memory access stalling or strangling overall progress. Moreover, this may also help to reduce power consumption (e.g., by reducing the amount of electrical signaling, by reducing the number of hardware structures through which electrical signals are conveyed, by avoiding needing to wake thread processors, etc.).

Some threads are relatively more memory access intensive than others. For example, some threads frequently access memory, whereas other threads less frequently access memory, rarely access memory, or never access memory. In some embodiments, the thread processor selector unit may select a thread processor for only a portion or subset of the relatively more memory access intensive threads. As shown, in some embodiments, the apparatus may optionally include an intensity determination unit 118. The intensity determination unit is operable to determine whether or not threads, for which accesses to the memory controllers were monitored, are memory access intensive threads. The determination may be made in different ways in different embodiments. In some embodiments, the determination may be based on an absolute level of memory access intensity. For example, it may be determined whether the memory access level meets (e.g., is equal to or greater than, is greater than, etc.) a predetermined threshold. In other embodiments, the determination may be based on a relative level of memory access intensity. For example, the memory access level for a thread may be compared with those of other threads and it may be determined whether the memory access level of the thread is within a predetermined proportion of the most memory access intensive threads.

If the thread is determined to be a memory access intensive thread, then the thread processor selector unit may select a thread processor for the thread, as previously described. Alternatively, if the thread is determined not to be a memory access intensive thread, then the thread processor selector unit may optionally omit selecting a thread processor for the thread and/or initiation of installation of the thread on a selected thread processor may optionally be omitted. Alternatively, in other embodiments, the thread processor selector unit may optionally select thread processors for all threads regardless of their memory access intensity levels, and in some embodiments threads may optionally be installed on the selected select thread processors for all threads regardless of their memory access intensity levels. In the illustrated embodiment, the intensity determination unit is part of the thread processor selector unit. Alternatively, the intensity determination unit may be separate from the thread processor selector unit and coupled with the memory controller access monitor unit and the thread processor selector unit.

It is to be appreciated that this is just one illustrative example embodiment. Other embodiments may have either fewer or more thread processors. Other embodiments may have more than two memory controllers and more than two corresponding share memories. In other embodiments, the thread processors may be coupled together in different configurations or arrangements. Still other embodiments are contemplated.

Figure 2:
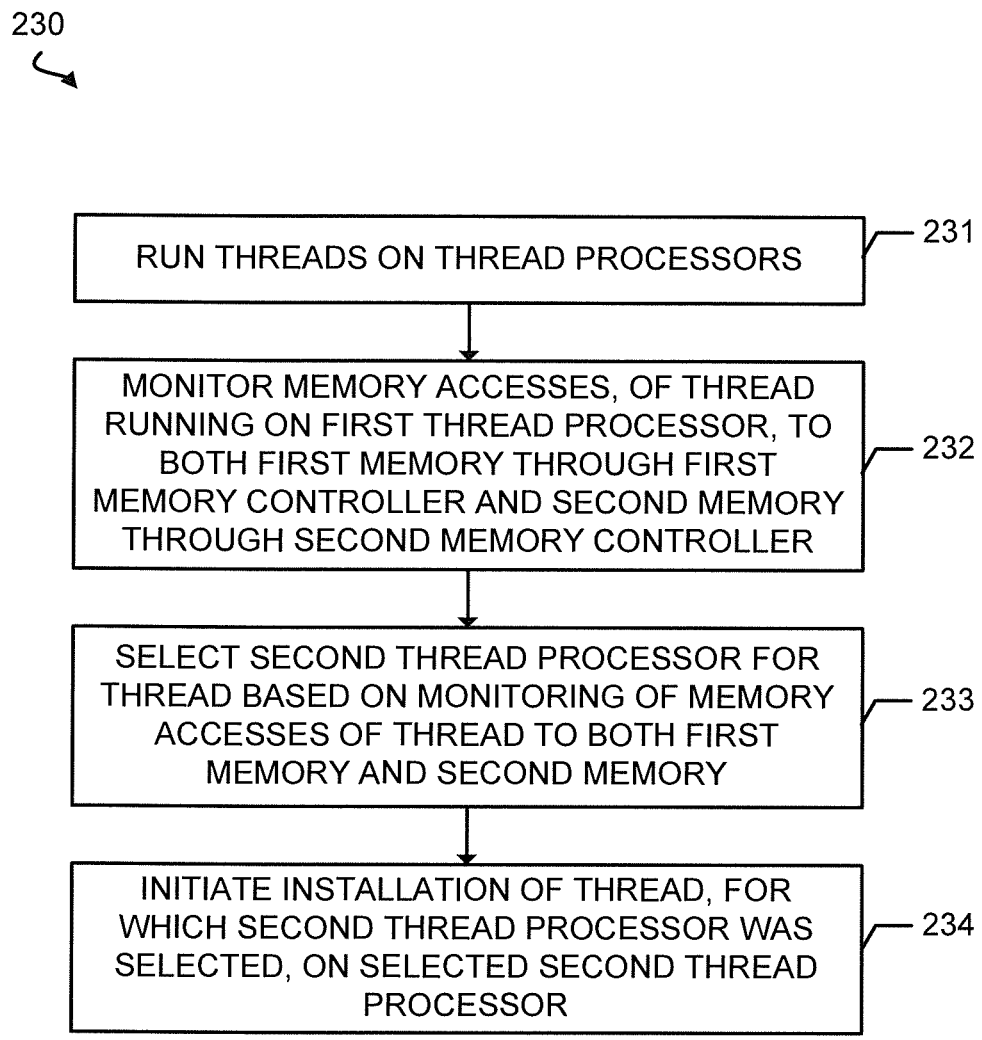
FIG. 2 is a block diagram of an embodiment of a method of monitoring accesses by a thread to multiple memories and/or memory controllers and selecting a thread processor for a thread based on the monitored accesses to the multiple memories and/or memory controllers.

FIG. 2 is a block diagram of an embodiment of a method 230 of monitoring accesses by a thread to multiple memories and/or memory controllers and selecting a thread processor for a thread based on the monitored accesses to the multiple memories and/or memory controllers. In some embodiments, the operations and/or method of FIG. 2 may be performed by and/or within the apparatus of FIG. 1. Alternatively, the operations and/or method of FIG. 2 may be performed by and/or within an entirely different apparatus. Moreover, the apparatus of FIG. 1 may perform operations and/or methods either the same as or entirely different than those shown in FIG. 2.

A plurality of threads may be run on a plurality of thread processors, at block 231. In some embodiments, the thread processors may represent cores or other processors of a single semiconductor substrate (e.g., an integrated circuit die) that are coupled together by an on-die or on-substrate interconnect (e.g., a mesh, torus, ring, etc.).

Memory accesses, of a first thread of the plurality that is running on a first thread processor of the plurality, may be monitored to both a first memory through a first memory controller and a second memory through a second memory controller, at block 232. Different ways of monitoring the accesses are contemplated. In some embodiments, a proportion of instructions processed by the thread that are cache misses (e.g., per-thread misses per thousand instructions) with respect to local caches of the thread processors may be monitored. In other embodiments, a count of cycle stalls for the thread (e.g., a per-thread stall cycles hardware counter) may be monitored. Other ways of monitoring the accesses are also contemplated. In some embodiments, the relative proportions of accesses to the first and second memories and/or memory controllers may be determined. In some embodiments, memory access latencies, queuing delays, and/or other parameters associated with accessing the memory controllers and/or memories may also be monitored.

A second thread processor of the plurality may be selected for a thread based on the monitoring of the memory accesses of the first thread to both the first and second memories and/or memory controllers, at block 233. In some embodiments, the second thread processor may be selected for the same first thread for which the memory accesses were monitored (i.e., at bock 232) and the first thread may be migrated to the selected second thread processor. In other embodiments, the second thread processor may be selected for another instance (e.g., a subsequent instance) of the first thread for which the memory accesses were monitored (i.e., at bock 232) and the other instance of the first thread may be scheduled on the selected second thread processor.

In some embodiments, the second thread processor may be selected to take into account the memory accesses to both the first and second memories and/or their corresponding memory controllers. The selected second thread processor may balance the overall time needed to access the first and second memories and/or memory controllers. In some embodiments, the balance may be based on the relative proportions (e.g., the fractions or percentages) of accesses for the first thread to the first and second memories and/or memory controllers. For example, memory access latencies to the first and second memories and/or memory controllers may be weighted or otherwise emphasized based on the proportion of the accesses to the memories and/or memory controllers. In some embodiments, the second thread processor may be selected to have minimal, near minimal, optimal, or near optimal weighted average memory access latency to the first and second memories and/or memory controllers. In some embodiments, in addition to and/or instead of latencies and proportions, the second thread processor may also or alternatively be selected based on queuing delays associated with accessing the first and second memories (e.g., a first queuing delay associated with accessing the first memory and a second queuing delay associated with accessing the second memory).

Referring again to FIG. 2, installation of the thread, for which the second thread processor was selected, is initiated on the second thread processor, at block 234. As will be described further below, in some embodiments, circuitry (e.g., integrated circuitry) or other hardware of an integrated circuit die or other semiconductor substrate may initiate the installation of the thread on the second thread processor, and an operating system may perform the actual installation of the thread on the second thread processor. In other embodiments, circuitry (e.g., integrated circuitry) or other hardware of an integrated circuit die or other semiconductor substrate may both initiate and perform the installation of the thread on the second thread processor. Advantageously, installing the thread on the selected second thread processor may help to improve performance due to reduced latencies of accessing one or both of the memories. Moreover, this may also help to reduce power consumption.

The method 230 has been described in a relatively basic form, but operations may optionally be added to and/or removed from the method. For example, other embodiments may optionally omit block 233 and/or block 234, such as, for example, if the method is one performed by integrated circuitry and an operating system performs the operation of block 233 and/or block 234. As another example, other embodiments may optionally add an operation to migrate or otherwise move an initial thread existing on the second thread processor from the second thread processor to some other thread processor prior to installation of the thread on the second thread processor. In some embodiments, if the initial thread accesses two or more memories and/or memory controllers it may optionally be migrated to a thread processor selected based on the accesses to the two or more memories and/or memory controllers to balance the access latencies as described elsewhere herein, although this is not required. As another option, if the initial thread is a low memory access intensity thread, or at least lower than the thread that is to be installed on the selected second thread processor, it may be migrated to another thread processor in a less prime location (e.g., to a farther away thread processor) in order to free the prime location for the thread with the higher memory access intensity. In addition, while the block flow diagrams show operations in series presentation, alternate embodiments may optionally perform the operations in different order, combine certain operations, overlap certain operations, etc.

Figure 3:
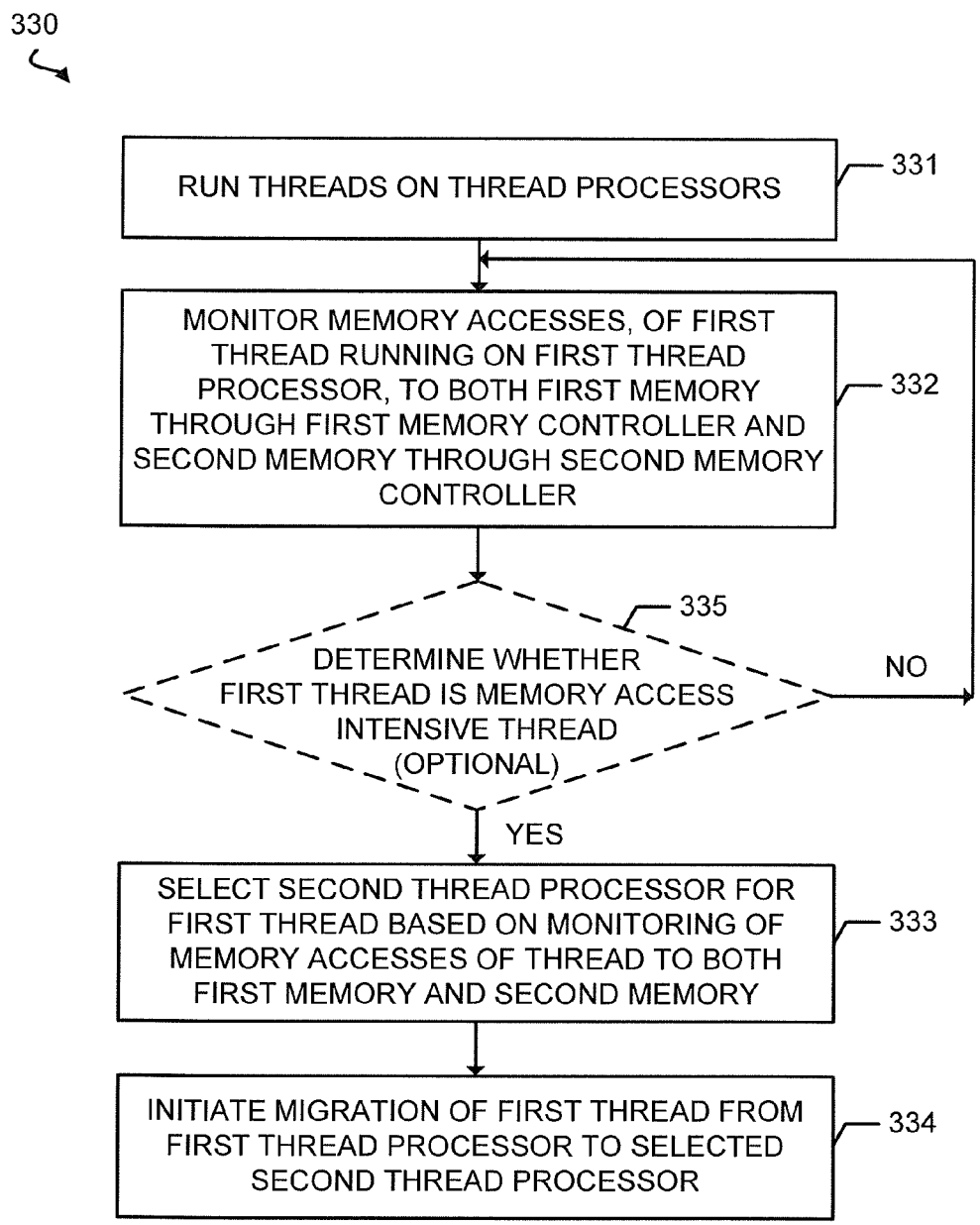
FIG. 3 is a block diagram of an embodiment of a method of monitoring accesses by a first thread running on a first thread processor to multiple memories, selecting a second thread processor for the first thread based on the monitoring, and initiating migration of the first thread from the first thread processor to the selected second thread processor.

FIG. 3 is a block diagram of an embodiment of a method 330 of monitoring accesses by a first thread running on a first thread processor to multiple memories, selecting a second thread processor for the first thread based on the monitoring, and initiating migration of the first thread from the first thread processor to the selected second thread processor. In some embodiments, the operations and/or method of FIG. 3 may be performed by and/or within the apparatus of FIG. 1. Alternatively, the operations and/or method of FIG. 3 may be performed by and/or within an entirely different apparatus. Moreover, the apparatus of FIG. 1 may perform operations and/or methods either the same as, or entirely different than, those shown in FIG. 3.

The method includes running a plurality of threads on a plurality of thread processors, at block 331. Memory accesses, of the first thread of the plurality of threads that is running on the first thread processor of the plurality of thread processors, are monitored to both a first memory through a first memory controller and a second memory through a second memory controller, at block 332.

A determination is optionally made whether or not the first thread, for which the memory accesses were monitored, is a memory access intensive thread, at block 335. The determination may be made in different ways in different embodiments. In some embodiments, the determination may be based on an absolute level of memory access intensity for the first thread. For example, it may be determined whether the memory access level of the first thread meets (e.g., is equal to or greater than, is greater than, etc.) a predetermined memory access threshold. By way of example, the threshold may represent a total number of memory accesses per unit time, a total number of memory accesses per number of instructions processed, etc. In other embodiments, the determination may be based on a relative level of memory access intensity of the first thread relative to other threads. For example, the memory access level for the first thread may be compared with the memory access levels of all of the other threads and it may be determined whether the memory access level of the first thread is within a predetermined proportion of the most memory access intensive threads (e.g., thirty percentage of the most memory access intensive threads, the top 10 most memory intensive threads, etc.).

If the first thread is determined not to be a memory access intensive thread (i.e., "no" is the determination at block 335), then method may return to block 332. In such case, at least at this point, a second thread processor will not be selected for the first thread nor will the first thread be migrated away from the first thread processor. Alternatively, if the first thread is determined to be a memory access intensive thread (i.e., "yes" is the determination at block 335), then the method may advance to block 333 where a second thread processor is selected for the first thread. Accordingly, the determination at block 335 optionally allows thread processors to be selected for a portion or subset of the relatively more memory access intensive threads. Alternatively, in other embodiments, such a determination may optionally be omitted, and thread processors may be selected for all threads regardless of their memory access intensity levels. In a still further embodiment, such a determination may optionally be omitted, and thread processors may be selected for all threads that access two or more memories and/or memory controllers.

At block 333, the second thread processor is selected for the first thread based on the monitoring of the memory accesses of the first thread to both the first and second memories. The selection of the second thread processor may be performed substantially as previously described. In some embodiments, the second thread processor is selected to balance, weight, or take into consideration memory access times (e.g., memory access latencies and/or queuing delays) to the first and second memories in proportion to the relative proportions of accesses to the first and second memories.

At block 334, migration of the first thread from the first thread processor to the selected second thread processor is initiated. In some embodiments, circuitry (e.g., integrated circuitry) or other hardware of an integrated circuit die or other semiconductor substrate having at least one thread processor may initiate the migration of the first thread from the first thread processor to the second thread processor, and an operating system may perform the actual migration of the first thread from the first thread processor to the second thread processor. In other embodiments, circuitry (e.g., integrated circuitry) or other hardware of an integrated circuit die or other semiconductor substrate having at least one thread processor may both initiate and perform the actual migration of the first thread from the first thread processor to the second thread processor. Accordingly, some embodiments provide for multiple memory controller access pattern and/or multiple memory access pattern aware thread migration. Advantageously, the ability to migrate the first thread to the selected second thread processor may help to improve performance due to reduced latencies of accessing one or more of the first and second memories. Moreover, the ability to migrate the first thread to the selected second thread processor may also help to reduce power consumption.

Figure 4:
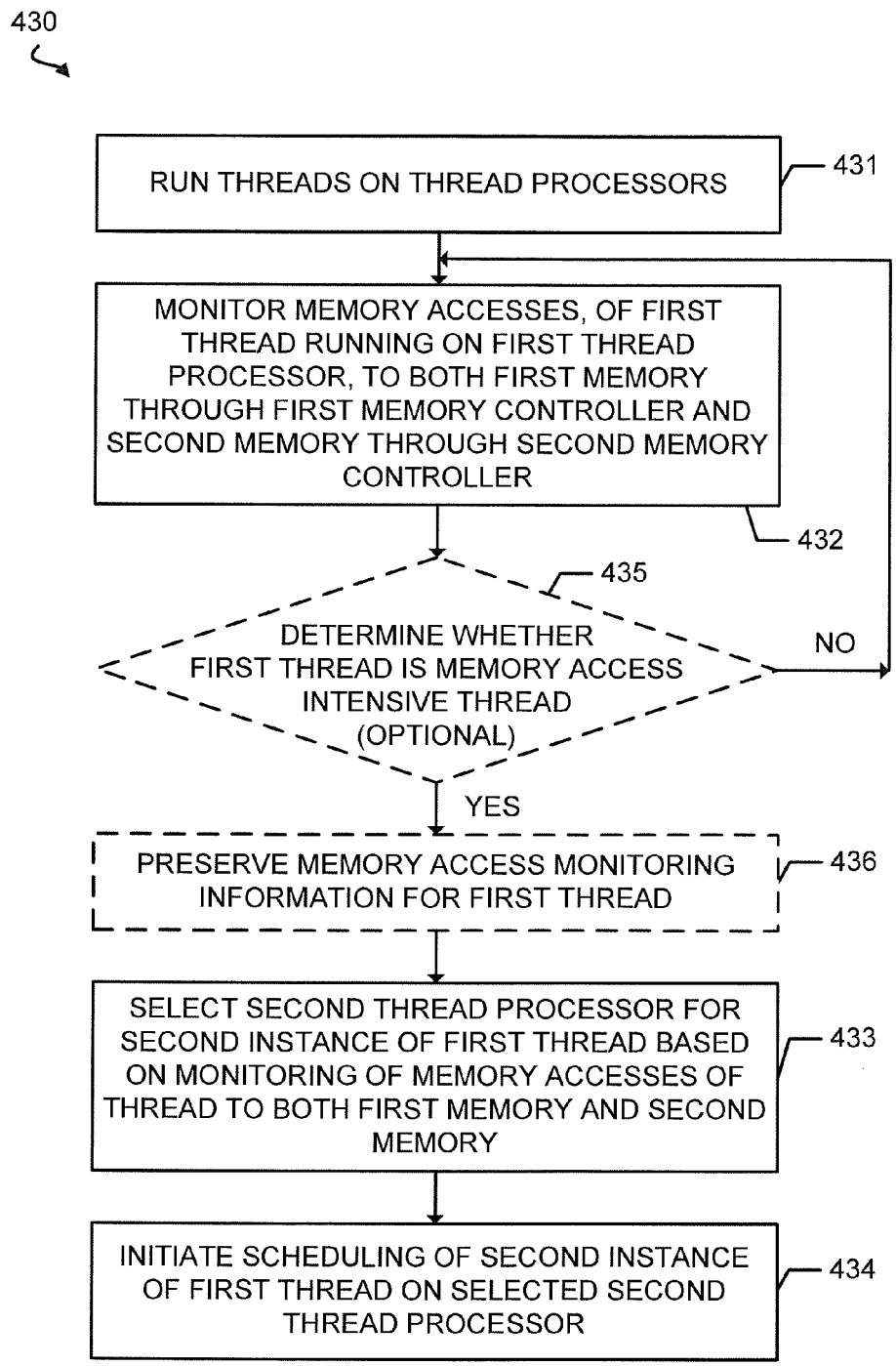
FIG. 4 is a block diagram of an embodiment of a method of monitoring accesses by a first thread running on a first thread processor to multiple memories, selecting a second thread processor for a second instance of the first thread based on the monitoring, and initiating scheduling of the second instance of the first thread on the selected second thread processor.

FIG. 4 is a block diagram of an embodiment of a method 430 of monitoring accesses by a first thread running on a first thread processor to multiple memories, selecting a second thread processor for a second instance of the first thread based on the monitoring, and initiating scheduling of the second instance of the first thread on the selected second thread processor. In some embodiments, the operations and/or method of FIG. 4 may be performed by and/or within the apparatus of FIG. 1. Alternatively, the operations and/or method of FIG. 4 may be performed by and/or within an entirely different apparatus. Moreover, the apparatus of FIG. 1 may perform operations and/or methods either the same as, or entirely different than, those shown in FIG. 4.

The method includes running a plurality of threads on a plurality of thread processors, at block 431. Memory accesses, of the first thread of the plurality of threads that is running on the first thread processor of the plurality of thread processors, are monitored to both a first memory through a first memory controller and a second memory through a second memory controller, at block 432.

A determination is optionally made whether or not the first thread, for which the memory accesses were monitored, is a memory access intensive thread, at block 435. The determination may be made substantially as previously described. If the first thread is determined not to be a memory access intensive thread (i.e., "no" is the determination at block 435), then method may return to block 432. Alternatively, if the first thread is determined to be a memory access intensive thread (i.e., "yes" is the determination at block 435), then the method may advance to block 436. In other embodiments, such a determination may optionally be omitted, and thread processors may be selected for all threads and/or all threads that access multiple memories, regardless of their memory access intensity levels.

At block 436, memory access monitoring information may optionally be preserved for the first thread. In some embodiments, this may include storing the memory access monitoring information. By way of example, in some embodiments, preserving the memory access monitoring information may include preserving information pertaining to proportions of accesses of the first thread to the first and second memories, memory access latencies for the first thread to the first and second memories, queuing delays associated with accesses by the first thread to the first and second memories, or the like, or some combination thereof. Alternatively, if a second instance of the first thread is to be scheduled while the memory accesses are being monitored, instead of sometime thereafter (e.g., after the first thread has stopped running), then preserving the memory access monitoring information may optionally be omitted.

At block 433, the second thread processor is selected for a second instance of the first thread based on the monitoring of the memory accesses of the first thread to both the first and second memories. The second instance of the first thread may represent a thread of the same type as the first thread and/or that is otherwise expected to have similar memory access characteristics to those of the first thread. In some embodiments, the first thread and the second instance of the first thread may represent the same or substantially the same algorithm, routine, sequence of instructions, portion of an application, or the like. As one example, the second instance of the first thread may represent an instance of the first thread that is run after the first thread has run and completed/stopped. In some cases, the first thread and the second instance of the first thread may represent an algorithm or routine run multiple times sequentially in different iterations of a loop. As another example, the second instance of the first thread may be a duplicate or copy of the first thread that is spawned to run concurrently with the first thread. For example, many duplicates or copies of the first thread may be spawned and run concurrently (e.g., to handle a large number of connections, etc.). The selection of the second thread processor may be performed substantially as previously described. In some embodiments, the second thread processor is selected to balance, weight, or take into consideration memory access times (e.g., memory access latencies and/or queuing delays) to the first and second memories in proportion to the relative proportions of accesses to the first and second memories by the first thread.

At block 434, scheduling of the second instance of the first thread on the selected second thread processor is initiated. In some embodiments, circuitry (e.g., integrated circuitry) or other hardware of an integrated circuit die or other semiconductor substrate having at least one thread processor may initiate the scheduling of the second instance of the first thread on the second thread processor, and an operating system may perform the actual scheduling of the second instance of the first thread on the second thread processor. In other embodiments, circuitry (e.g., integrated circuitry) or other hardware of an integrated circuit die or other semiconductor substrate having at least one thread processor may both initiate and perform the actual scheduling of the second instance of the first thread on the second thread processor. Advantageously, scheduling the second instance of the first thread on the selected second thread processor may help to improve performance due to reduced latencies of accessing one or more of the first and second memories. Moreover, scheduling the second instance of the first thread on the selected second thread processor may also help to reduce power consumption.

Figure 5:
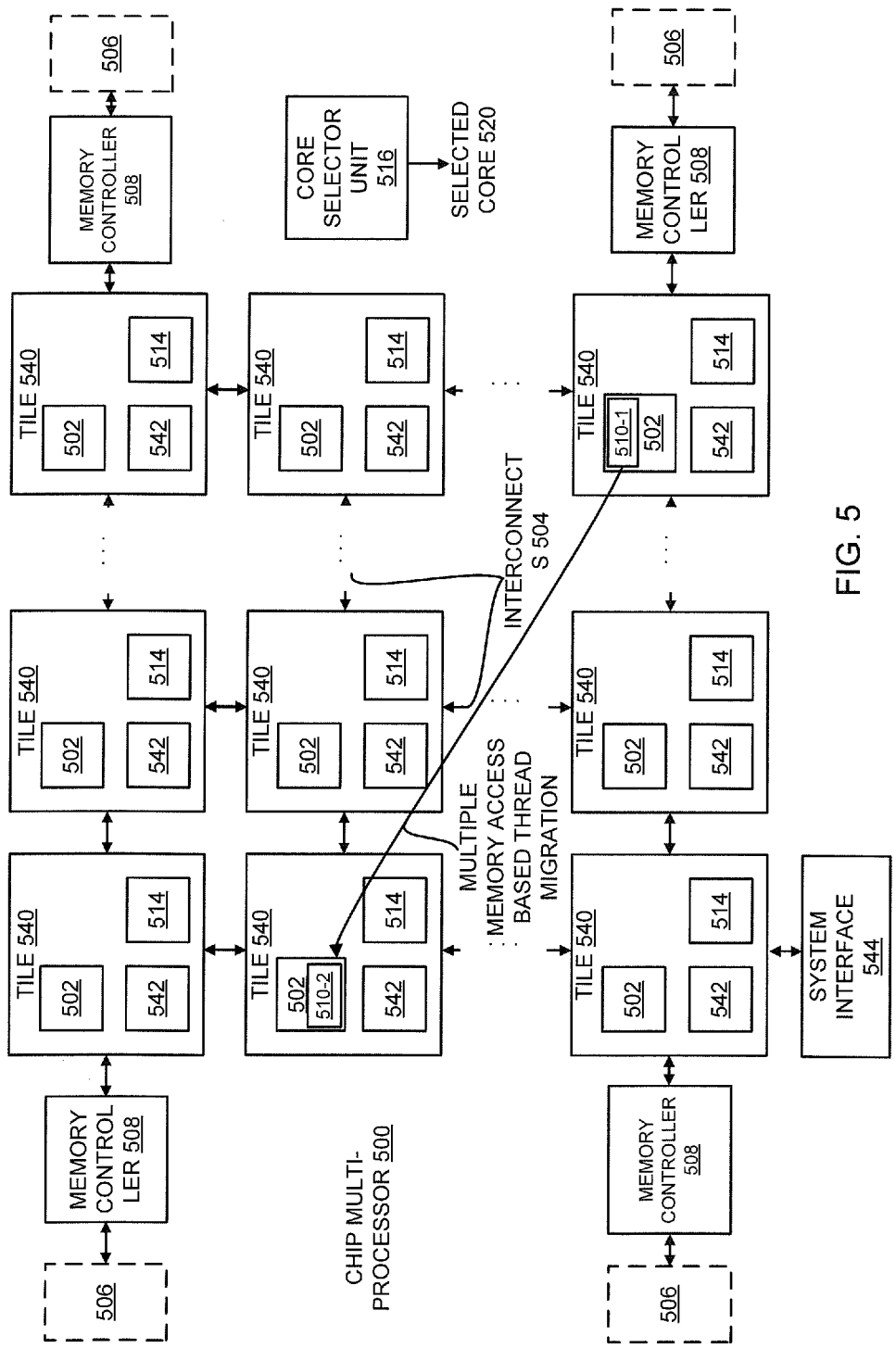
FIG. 5 is a block diagram of an example embodiment of a chip multi-processor (CMP) including multiple tiles each having one or more cores and multiple memory controller access based core selection logic that is operable to select a core for a thread based on accesses by a thread to multiple memory controllers.

FIG. 5 is a block diagram of an example embodiment of a chip multi-processor (CMP) 500 including multiple tiles 540 each having one or more cores 502 and multiple memory controller access based core selection logic 514, 516 that is operable to select a core 502 for a thread based on accesses by a thread to multiple memory controllers 508. In some embodiments, the CMP of FIG. 5 may perform the operations and/or methods of any of FIGS. 2-4. Alternatively, the CMP of FIG. 5 may perform entirely different operations and/or methods. Moreover, the operations and/or methods of FIGS. 2-4 may be performed by CMPs either the same as, or entirely different than, that of FIG. 5.

In the illustrated embodiment, there are nine tiles, although other embodiments may include either more or less tiles. For example, in other embodiments there may be 16-tiles, 32-tiles, 64-tiles, 80-tiles, or some other number. In some embodiments, all of the tiles are included on a same integrated circuit die or semiconductor substrate. Each tile includes one or more cores 502. Each of the cores represents a thread processor. Each core is operable to process one or more threads. The tiles and/or cores are coupled together, or otherwise in communication, through interconnects 504. By way of example, the interconnects may be on-die or on-substrate mesh, torus, ring, or network interconnects. Each tile may include a switch or router (not shown) to connect the tile to the interconnect. Each tile also includes one or more levels of cache 542. In the illustrated embodiment, each tile also includes a distributed memory controller access monitor unit. Alternatively, in another embodiment, distributed memory controller access monitor units may be shared by two or more cores. In yet another embodiment, a single shared memory controller access monitor unit may be shared by all of the cores.

In the illustrated embodiment, the top right, top left, bottom right, and bottom left tiles each have a corresponding directly coupled memory controller 508. In some embodiments, the memory controllers are on the same die or substrate as the cores. In other embodiments, the memory controllers may be on a separate die or substrate than the cores. As shown, at least some interior tiles do not have a corresponding directly coupled memory controller, although some may. In other embodiments, different configurations of coupling memory controllers to tiles known in the arts may be used. Each of the memory controllers is operable to couple with and provide access to a corresponding memory 506. A system interface 544 is operable to provide an interface for the CMP to an external signaling medium (e.g., a chipset or system in which the CMP is deployed).

The CMP includes the multiple memory controller access based core selection logic 514, 516 that is operable to select a core 502 for a thread based on accesses by a thread to multiple memory controllers 508. Each of the distributed memory controller access monitor units is operable to monitor accesses to the memories and/or memory controllers for the corresponding core(s) of the tile in which it is included. The monitoring of these accesses may be performed as described elsewhere herein. A core selector unit 516 is operable to select a core for a thread based on the monitoring of the accesses. The core may be selected as described elsewhere herein for the selection of thread processors. A selected core 520 may be output. As shown, in one example embodiment, the CMP upon monitoring that a thread 510-1 on a core 502 relatively far removed from the top left and bottom left memory controllers is accessing the top left and bottom left memory controllers, may move the thread 510-1 to a thread 510-2 on a core 502 closer to both the top left and bottom left memory controllers. In some embodiments, the thread 510-2 may be moved to a core on a shortest path coupling the two most frequently accessed memory controllers, although this is not required.

Figure 6:
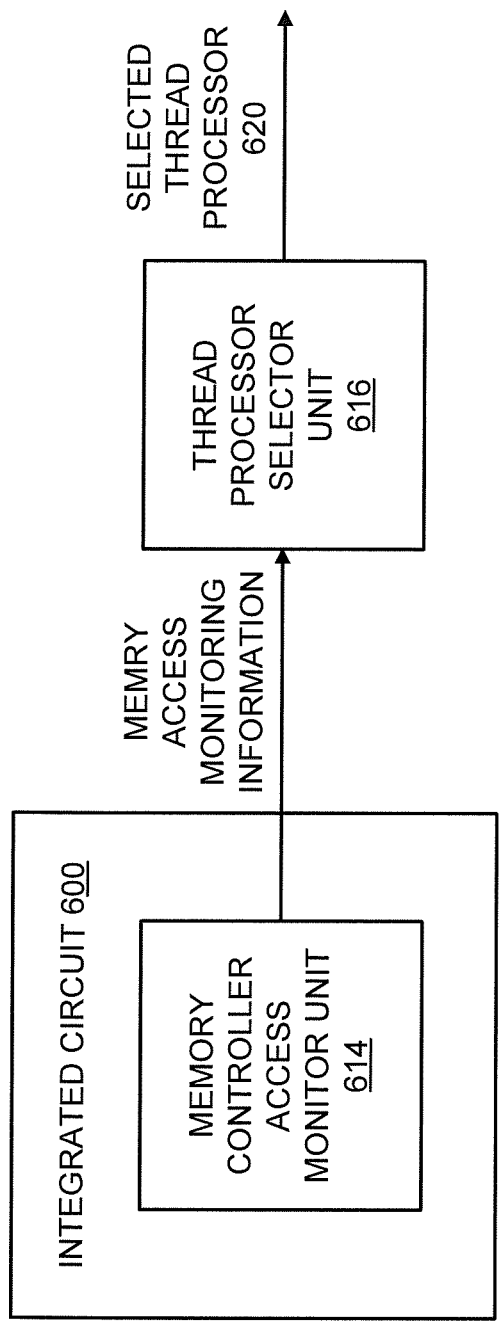
FIG. 6 is a block diagram of an embodiment of a memory controller access monitor unit located on an integrated circuit and a thread processor selector unit located off of the integrated circuit.

FIG. 6 is a block diagram of an embodiment of a memory controller access monitor unit 614 located on an integrated circuit 600 and a thread processor selector unit 616 located off of the integrated circuit. The memory controller access monitor unit may provide memory access monitoring information (e.g., percentages of accesses to memory controllers, access latencies, queuing delays, etc.) to the thread processor selector unit, which may output a selected thread processor 620. In some embodiments, the thread processor selector unit is implemented as part of an operating system or other software.

Figure 7:
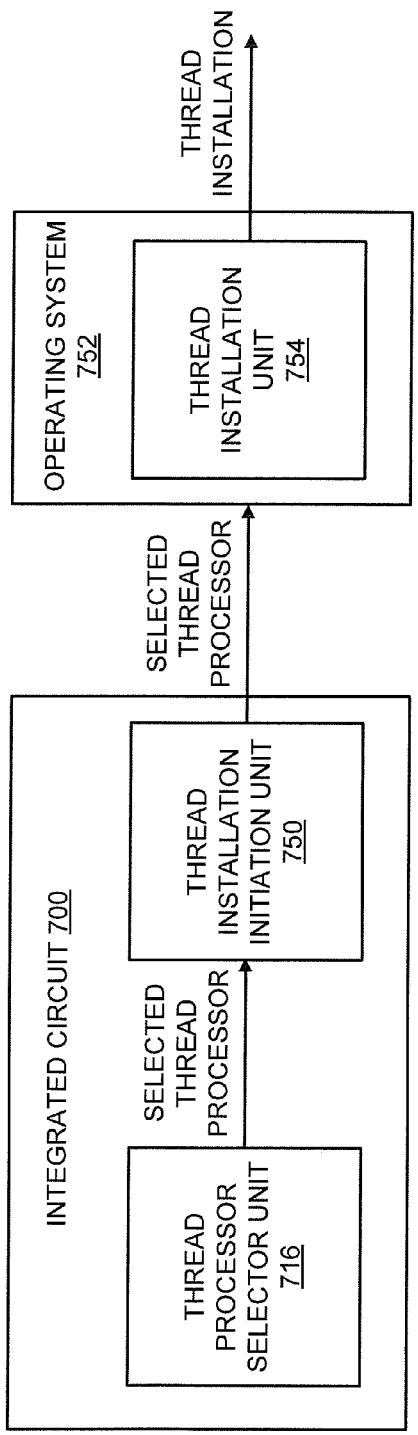
FIG. 7 is a block diagram illustrating an embodiment in which a thread installation initiation unit of an integrated circuit communicates or cooperates with a thread installation unit of an operating system to install a thread.

FIG. 7 is a block diagram illustrating an embodiment in which a thread installation initiation unit 750 of an integrated circuit 700 communicates or cooperates with a thread installation unit 754 of an operating system 752 to install a thread. The integrated circuit includes a thread processor selector unit 716 and the thread installation initiation unit 750. The integrated circuit also includes the thread processors (not shown). The thread processor selector unit is operable to select and output a selected thread processor as described elsewhere herein. The thread installation initiation unit is operable to receive the selected thread processor and initiate installation of a thread on the selected thread processor. By way of example, the thread installation initiation unit may access and change one or more bits in a register that is used as a communication interface between the integrated circuit and the operating system. The thread installation initiation unit may be implemented in logic of the integrated circuit including hardware, firmware, software, or a combination thereof. The operating system 752 (e.g. an operating system module stored in a memory) includes the thread installation unit 754 (e.g., a thread scheduler unit, thread migration unit, etc.). The thread installation unit is operable to install the thread on the selected thread processor. In some embodiments, the thread installation unit may be operable to install the thread on a thread processor selected based at least in part on a relative proportion of accesses by a thread to both the first and second memories and/or based at least in part on latencies of access by the thread to both the first and second memories. Currently, many operating systems are primarily responsible for thread installation (e.g., scheduling, migration, etc.). The approach of this embodiment complies with such existing functionality.

Figure 8:
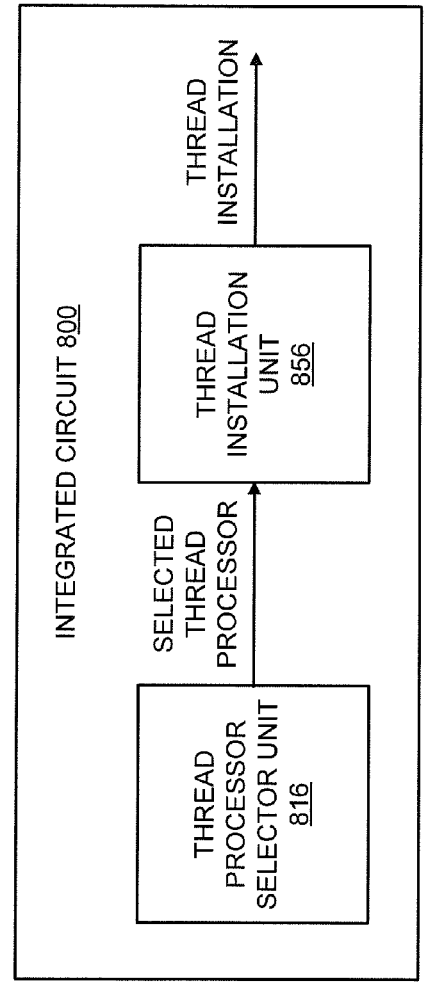
FIG. 8 is a block diagram illustrating an embodiment in which a thread installation unit of an integrated circuit autonomously performs thread installation without needing an operating system to perform the thread installation.

FIG. 8 is a block diagram illustrating an embodiment in which a thread installation unit 856 of an integrated circuit 800 autonomously performs thread installation without needing an operating system to perform the thread installation. The integrated circuit includes a thread processor selector unit 816 and the thread installation unit 856. The thread processor selector unit is operable to select and output a selected thread processor as described elsewhere herein. The thread installation unit is operable to receive the selected thread processor and install a thread on the selected thread processor. By way of example, the thread installation unit may represent a thread migration unit and/or a thread scheduling unit. The thread installation unit may be implemented in logic of the integrated circuit including hardware, firmware, software, or a combination thereof. The approach of this embodiment allows a thread to be installed on a selected thread processor using hardware of the integrated circuit without needing the involvement of the operating system. In some cases, the operating system may be informed e.g., through the integrated circuit modifying bits in a register, sending a message to the operating system, etc.

In the description above, specific approaches for selecting a thread processor based on accesses to two or more memories and/or memory controllers have been described. In other embodiments, either more elaborate or less elaborate approaches may be used to select a thread processor as compared to those described. The more elaborate approaches may take into consideration additional factors and/or parameters. Examples of such include, but are not limited to, the "cost" of relocating a thread initially running on a desired destination thread processor to free it up, different interconnect bandwidths, accesses of other threads (e.g., to use the most desirable thread processors for the threads with the most frequent accesses), etc. The less elaborate approaches may take into consideration less information. For example, in one contemplated embodiment of a less elaborate approach, the destination core may be selected to be halfway between the two memory controllers used by the thread. Although such an approach may not improve the memory access latency as much as the approaches described above, it may nevertheless improve memory access latency somewhat which may be sufficient for the particular implementation.

In the above-described embodiments, for simplicity, a thread processor has been emphasized as being selected for a thread based on accesses to two memories and/or two memory controllers. In other embodiments, this may be based on accesses to three or more memories and/or three or more memory controllers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
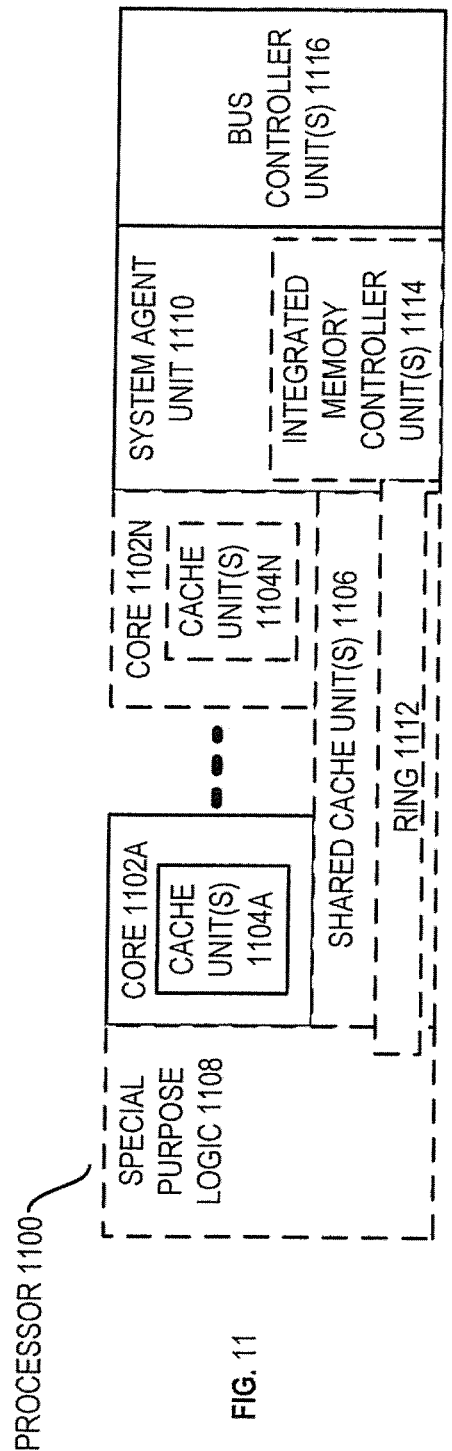
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
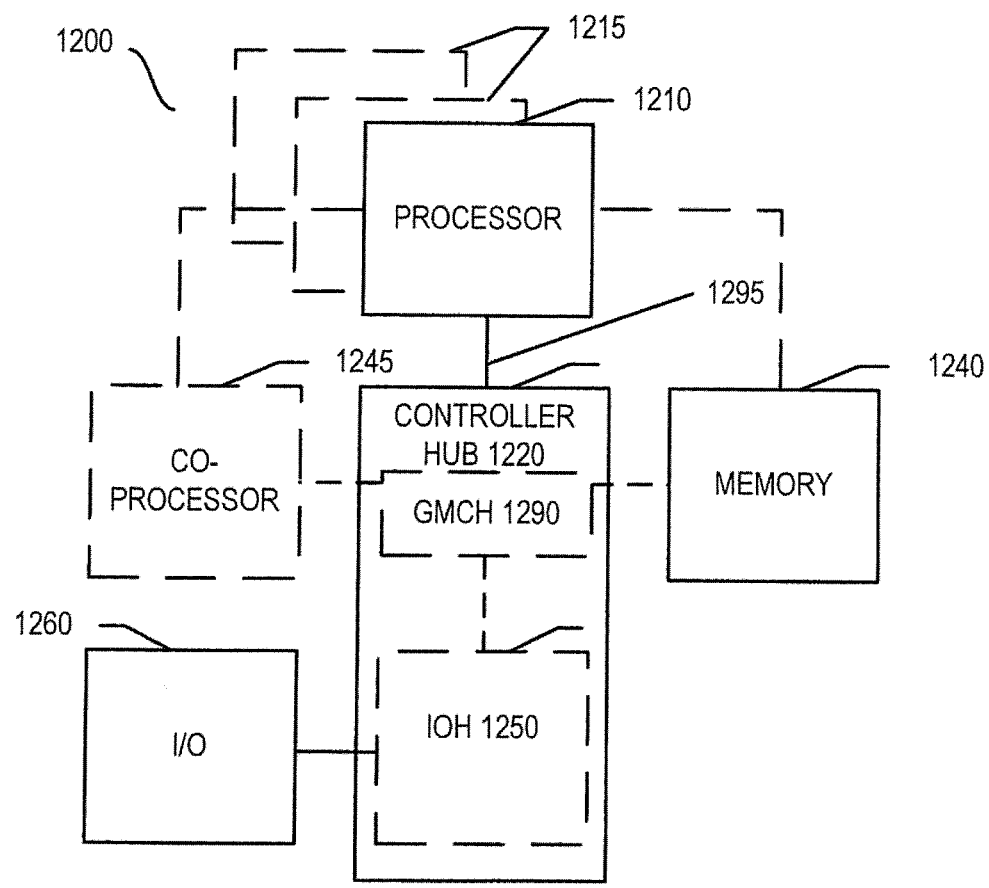
FIG. 12, shown is a block diagram of a system 1200 in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
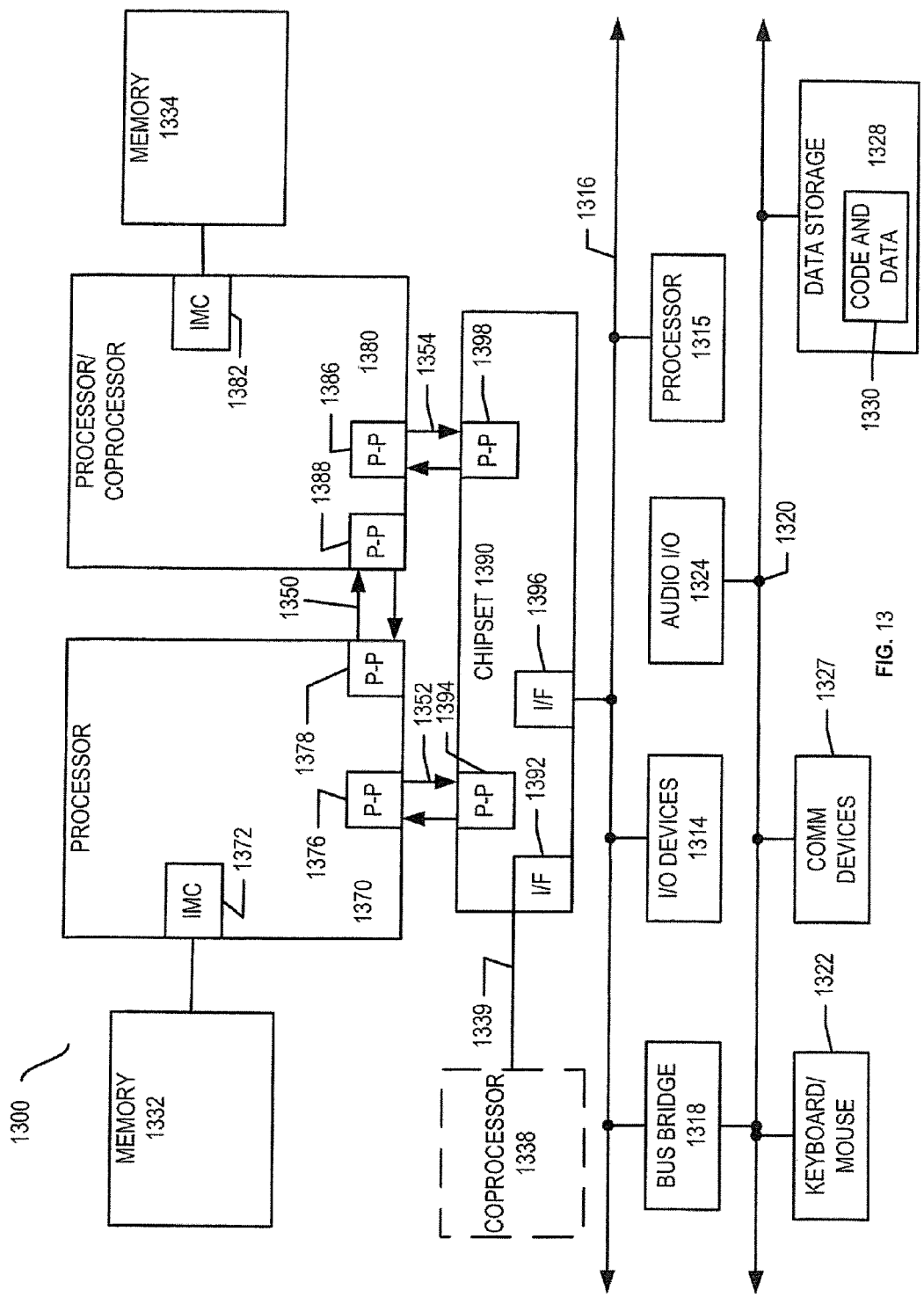
FIG. 13, shown is a block diagram of a first more specific exemplary system 1300 in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
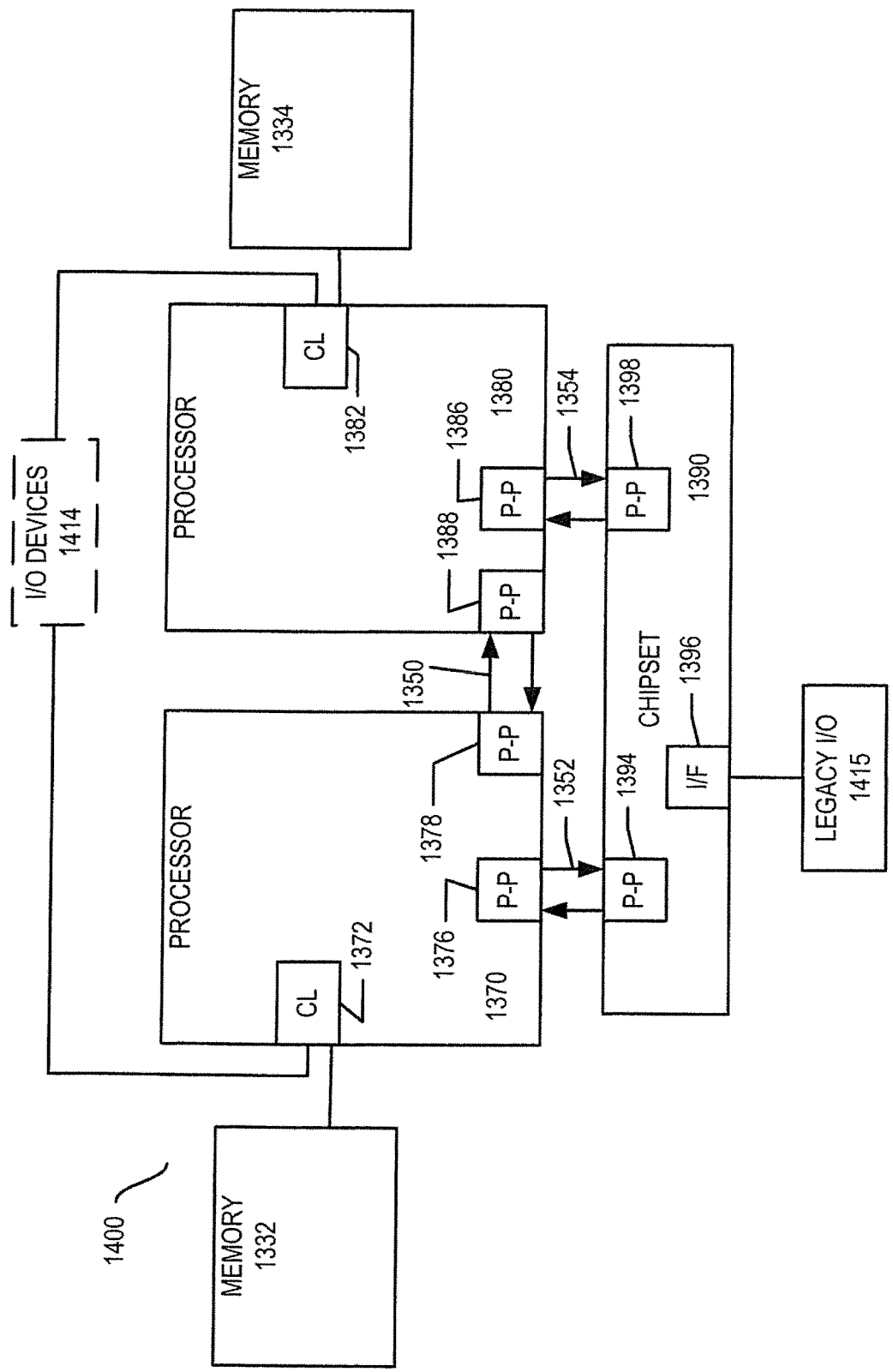
FIG. 14, shown is a block diagram of a second more specific exemplary system 1400 in accordance with an embodiment of the present invention.

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
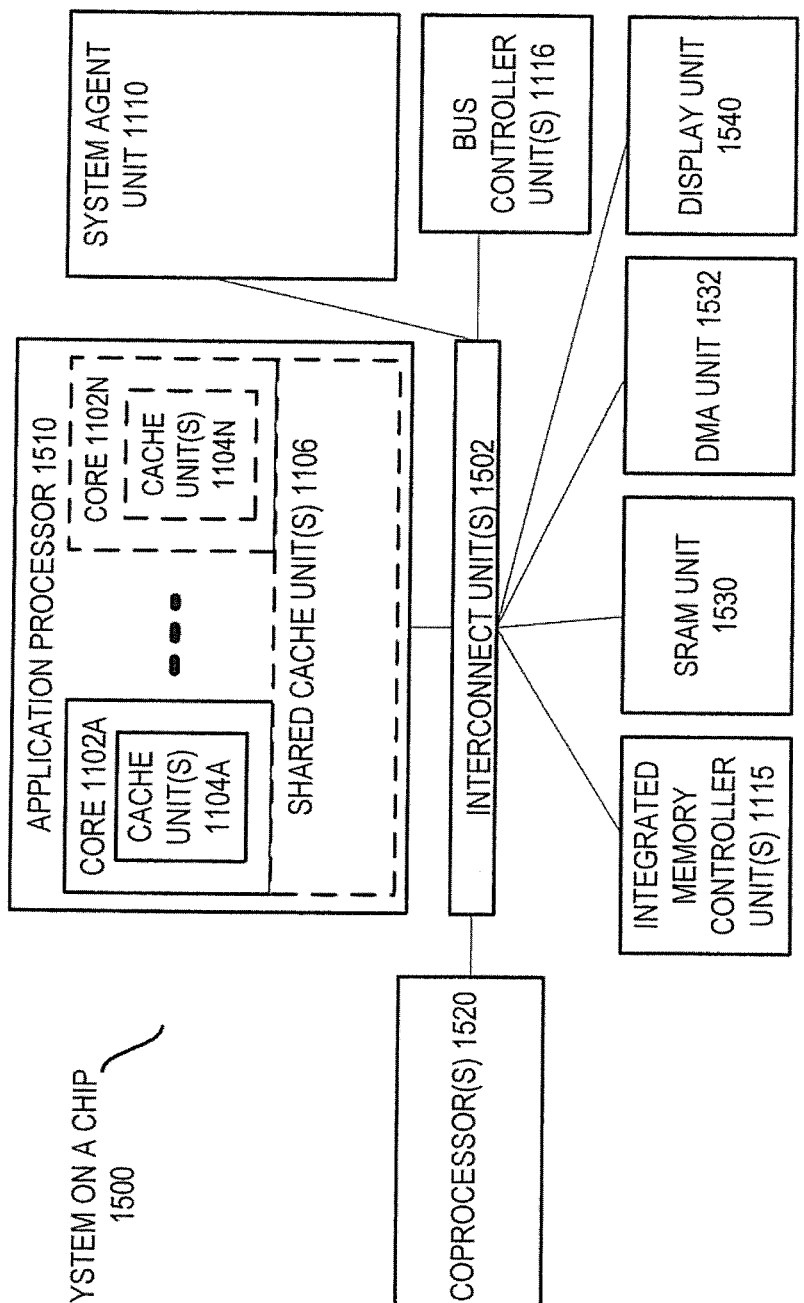
FIG. 15, shown is a block diagram of a SoC 1500 in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. It will also be appreciated, by one skilled in the art, that modifications may be made to the embodiments disclosed herein, such as, for example, to the configurations, functions, and manner of operation and use, of the components of the embodiments. All equivalent relationships to those illustrated in the drawings and described in the specification are encompassed within embodiments of the invention. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated. Certain operations may be performed by hardware components. The operations may also optionally be performed by a combination of hardware and software.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, one or more or a sequence of instructions and/or data structures that if executed by a machine causes or results in the machine performing, and/or causes the machine to perform, one or more or a portion of the operations or methods or the techniques shown in the figures disclosed herein. Examples of suitable machines include, but are not limited to, computer systems, desktops, laptops, notebooks, servers, network devices, routers, switches, and other electronic devices having one or more processors. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers).

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The following clauses and/or examples pertain to further embodiments. Specifics in the clauses and/or examples may be used anywhere in one or more embodiments.

In one embodiment, a first method includes running a plurality of threads on a plurality of thread processors. Memory accesses, of a thread of the plurality that is running on a first thread processor of the plurality, are monitored to both a first memory through a first memory controller and a second memory through a second memory controller. A second thread processor of the plurality is selected for a thread based on the monitoring of the memory accesses of the thread to both the first memory and the second memory. Installation of the thread, for which the second thread processor was selected, is initiated on the second thread processor.

Embodiments include the first method in which the second thread processor is selected to improve overall memory access latency from the second thread processor to the first and second memories.

Embodiments include any of the above first methods in which the second thread processor is selected based on a relative proportion of the monitored memory accesses to the first and second memories.

Embodiments include any of the above first methods in which the second thread processor is selected based on a first queuing delay associated with memory accesses to the first memory and a second queuing delay associated with memory accesses to the second memory.

Embodiments include any of the above first methods in which the second thread processor is selected for the same thread for which the memory accesses to both the first and second memories were monitored, and in which initiating includes initiating migration the thread from the first thread processor to the second thread processor, or in which the second thread processor is selected for a second instance of the thread for which the memory accesses to both the first and second memories were monitored, and in which initiating includes initiating scheduling of the second instance of the thread on the second thread processor.

Embodiments include any of the above first methods further including, prior to selecting the second thread processor, determining that the thread for which the memory accesses were monitored is a memory access intensive thread.

Embodiments include the above first method in which determining that the thread is the memory access intensive thread includes determining at least one of: (a) that the memory accesses of the memory access intensive thread meet a memory access threshold; and (b) that the memory accesses of the memory access intensive thread are greater than a given proportion of other threads running on the plurality of thread processors.

Embodiments include any of the above first methods in which monitoring the memory accesses includes monitoring at least one of: (a) a proportion of instructions processed by the thread that are cache misses; and (b) a count of cycle stalls for the thread.

Embodiments include any of the above first methods in which the second thread processor is selected as one of a plurality of thread processors that are coupled between a thread processor directly coupled with the first memory controller and a thread processor directly coupled with the second memory controller.

Embodiments include any of the above first methods in which running the threads on the thread processors includes running the threads on a plurality of cores of a multi-core processor.

Embodiments include any of the above first methods further including installing the thread on the second thread processor using thread installation logic of an integrated circuit having the second thread processor.

In one embodiment, at least one machine-readable medium includes instructions that in response to being executed on a machine cause the machine to carry out any of the above first methods.

In one embodiment, an apparatus is configured or operable to perform any of the above first methods.

In one embodiment, a first apparatus includes a plurality of thread processors to run a plurality of threads. A first memory controller is coupled with the plurality of thread processors. The first memory controller is to couple with and provide access to a first memory. A second memory controller is coupled with the plurality of thread processors. The second memory controller is to couple with and provide access to a second memory. A memory controller access monitor unit is coupled with a first thread processor of the plurality. The memory controller access monitor unit is to monitor accesses, by a thread of the plurality that is running on the first thread processor, to both the first memory controller and the second memory controller. A thread processor selector unit is coupled with the memory controller access monitor unit. The thread processor selector unit is to select a second thread processor of the plurality for a thread based on the monitoring of the accesses by the thread to both the first memory controller and the second memory controller.

Embodiments include the first apparatus in which the thread processor selector unit is to select the second thread processor to improve overall memory access latency from the second thread processor to the first and second memories.

Embodiments include any of the above first apparatus in which the thread processor selector unit is to select the second thread processor based on a relative proportion of the monitored accesses to the first and second memory controllers.

Embodiments include any of the above first apparatus in which the thread processor selector unit is to select the second thread processor based on a first queuing delay associated with memory accesses to the first memory and a second queuing delay associated with memory accesses to the second memory.

Embodiments include any of the above first apparatus in which the thread processor selector unit is to select the second thread processor for the same thread for which the memory controller access monitor unit is to monitor the accesses to both the first and second memory controllers. The first apparatus further includes a thread migration initiation unit to initiate migration of the thread from the first thread processor to the second thread processor.

Embodiments include the first apparatus in which the thread processor selector unit is to select the second thread processor for a second instance of the thread for which the memory controller access monitor unit is to monitor the accesses to both the first and second memory controllers. The first apparatus further includes a thread scheduling initiation unit to initiate scheduling of the second instance of the thread on the second thread processor.

Embodiments include any of the above first apparatus further including a memory controller access intensity determination unit coupled with the memory controller access monitor unit. The memory controller access intensity determination unit is to determine that the thread, for which the memory controller access monitor unit is to monitor the accesses to both the first and second memory controllers, is a memory access intensive thread.

Embodiments include any of the above first apparatus in which the memory controller access monitor unit is to monitor at least one of: (a) a proportion of instructions processed by the thread that are cache misses; and (b) a count of cycle stalls for the thread.

Embodiments include any of the above first apparatus in which the first thread processor is coupled with the first memory controller through a plurality of intervening thread processors coupled between the first thread processor and the first memory controller.

Embodiments include any of the above first apparatus in which the thread processors include a plurality of cores of a multi-core processor.

Embodiments include any of the above first apparatus further including a thread installation unit to install the thread on the second thread processor. The thread installation unit includes logic of an integrated circuit having the second thread processor.

In one embodiment, a second apparatus includes a plurality of thread processors to run a plurality of threads. A first memory controller is coupled with the plurality of thread processors. The first memory controller is to couple with and provide access to a first memory. A second memory controller is coupled with the plurality of thread processors. The second memory controller is to couple with and provide access to a second memory. A first means is coupled with a first thread processor of the plurality. The first means is for monitoring accesses, by a thread of the plurality that is running on the first thread processor, to both the first memory controller and the second memory controller. A second means is coupled with the first means. The second means is for selecting a second thread processor of the plurality for a thread based on the monitoring of the accesses by the thread to both the first memory controller and the second memory controller.

In one embodiment, a first system includes a first memory, a second memory, a first memory controller coupled with the first memory to provide access to the first memory, and a second memory controller coupled with the second memory to provide access to the second memory. The first system also includes a plurality of thread processors coupled with the first and second memory controllers. The thread processors are to run a plurality of threads that access the first and second memories through the first and second memory controllers. An operating system module is to be stored in a memory. The operating system module is to install a thread on a thread processor based at least in part on a relative proportion of accesses by the thread to both the first and second memories.

Embodiments include the first system in which average memory access latency for accesses from the thread processor to the first and second memories is less than from any other thread processor.

Embodiments include the first system in which the operating system module is to migrate an existing thread from the thread processor to another thread processor prior to installing the thread on the thread processor.

What is claimed is:

1. An apparatus comprising:
a plurality of thread processors of a multi-core processor to run a plurality of threads;
a first memory controller directly coupled to a first thread processor and indirectly coupled to at least a second thread processor via a first set of one or more intervening thread processors, the first memory controller to provide access to a first memory;
a second memory controller directly coupled to a third thread processor and indirectly coupled to at least a fourth thread processor via one or more intervening thread processors to provide access to a second memory;
a memory controller access monitor unit coupled with the second thread processor of the plurality of thread processors, the memory controller access monitor unit to monitor proportions of memory accesses, of a thread of the plurality of threads that is to run on the second thread processor, to both the first memory and the second memory, wherein the thread is to access the first memory via the first set of the one or more intervening thread processors and the first memory controller, wherein the thread is to access the second memory via at least the third thread processor and the second memory controller; and
a thread processor selector unit coupled with the memory controller access monitor unit, the thread processor selector unit to select a destination thread processor of the plurality of thread processors of the multi-core processor based on the monitored proportions of memory accesses by the thread to both the first memory and the second memory and at least a queueing delay associated with accessing the first memory, wherein the queueing delay is to incorporate one or more queueing delays for hops through the first set of the one or more intervening thread processors and is to incorporate a queueing delay within the first memory controller; and
a thread migration initiation unit coupled with the memory controller access monitor unit, the thread migration initiation unit to initiate migration of the thread to the destination thread processor of the plurality of thread processors of the multi-core processor.

2. The apparatus of claim 1, wherein the thread processor selector unit is to select the destination thread processor to improve overall memory access latency from the thread to the first and second memories.

3. The apparatus of claim 1, further comprising a memory controller access intensity determination unit coupled with the memory controller access monitor unit, the memory controller access intensity determination unit to determine that the thread, for which the memory controller access monitor unit is to monitor the accesses to both the first and second memory, is a memory access intensive thread.

4. The apparatus of claim 1, wherein the memory controller access monitor unit is to monitor at least one of: (a) a proportion of instructions processed by the thread that are cache misses; and (b) a count of cycle stalls for the thread.

5. The apparatus of claim 1, wherein the second thread processor is coupled with the first memory controller through a plurality of intervening thread processors coupled between the second thread processor and the first memory controller.

6. The apparatus of claim 1, wherein the fourth thread processor is coupled with the second memory controller through a plurality of intervening thread processors.

7. The apparatus of claim 1, further comprising a thread installation unit to install the thread on the destination thread processor, wherein the thread installation unit comprises logic of an integrated circuit having the second thread processor.

8. A system comprising:
a first memory;
a second memory;
a plurality of thread processors of a multi-core processor to run a plurality of threads;
a first memory controller, directly coupled to the first memory, and directly coupled to a first thread processor, and indirectly coupled to at least a second thread processor via a first set of one or more intervening thread processors, the first memory controller to provide access to the first memory;

a second memory controller, directly coupled to the second memory, directly coupled to a third thread processor, and indirectly coupled to at least a fourth thread processor via one or more intervening thread processors, to provide access to the second memory;

a memory controller access monitor unit coupled with the second thread processor of the plurality of thread processors, the memory controller access monitor unit to monitor proportions of memory accesses, of a thread of the plurality of threads that is to run on the second thread processor, to both the first memory and the second memory, wherein the thread is to access the first memory via the first set of the one or more intervening thread processors and the first memory controller, wherein the thread is to access the second memory via at least the third thread processor and the second memory controller; and a thread processor selector unit coupled with the memory controller access monitor unit, the thread processor selector unit to select a destination thread processor of the plurality of thread processors of the multi-core processor based on the monitored proportions of memory accesses by the thread to both the first memory and the second memory and at least a queueing delay associated with accessing the first memory, wherein the queueing delay is to incorporate one or more queueing delays for hops through the first set of the one or more intervening thread processors and is to incorporate a queueing delay within the first memory controller; and a thread migration initiation unit coupled with the memory controller access monitor unit, the thread migration initiation unit to initiate migration of the thread to the destination thread processor of the plurality of thread processors of the multi-core processor.

9. The system of claim 8, wherein the thread processor selector unit is to select the destination thread processor to improve overall memory access latency from the thread to the first and second memories.

10. The system of claim 8, further comprising a memory controller access intensity determination unit coupled with the memory controller access monitor unit, the memory controller access intensity determination unit to determine that the thread, for which the memory controller access monitor unit is to monitor the accesses to both the first and second memory, is a memory access intensive thread.

11. The system of claim 8, wherein the memory controller access monitor unit is to monitor at least one of: (a) a proportion of instructions processed by the thread that are cache misses; and (b) a count of cycle stalls for the thread.

12. The system of claim 8, wherein the second thread processor is coupled with the first memory controller through a plurality of intervening thread processors coupled between the second thread processor and the first memory controller.

13. The system of claim 8, wherein the fourth thread processor is coupled with the second memory controller through a plurality of intervening thread processors.

14. The system of claim 8, further comprising a thread installation unit to install the thread on the destination thread processor, wherein the thread installation unit comprises logic of an integrated circuit having the second thread processor.

15. A method comprising:
running a plurality of threads on a plurality of thread processors of a multi-core processor on a single integrated circuit substrate, wherein at least a first thread processor of the plurality of thread processors is directly coupled to a first memory controller and at least a second thread processor of the plurality of thread processors is indirectly coupled to the first memory controller via one or more intervening thread processors;

monitoring relative proportions of memory accesses, of a thread of one or more threads that are running on the second thread processor of the plurality of thread processors, to both a first memory and a second memory, wherein the thread accesses the first memory via the one or more intervening thread processors and the first memory controller that is directly coupled to the first memory by an interconnect, wherein the thread accesses the second memory via one or more intervening thread processors and a second memory controller that is directly coupled to the second memory by an interconnect;

selecting a destination thread processor of the plurality of thread processors for migrating the thread based on the monitored relative proportions of memory accesses of the thread to both the first memory and the second memory and at least a queueing delay associated with accessing the first memory, wherein the queueing delay account for a cumulative queuing delay for hops through the one or more intervening thread processors and a queuing delay within the memory first controller, wherein the selecting of the destination thread processor balances memory access time to both the first memory and the second memory based on the monitored relative proportions of memory accesses; and migrating the thread to the destination thread processor of the plurality of thread processors of the multi-core processor on the single integrated circuit substrate.

16. The method of claim 15, wherein selecting comprises selecting the destination thread processor to improve overall memory access latency from the destination thread processor to the first and second memories.

17. The method of claim 15, wherein selecting comprises selecting the destination thread processor for the thread for which the memory accesses to both the first and second memories were monitored.

18. The method of claim 15, further comprising, prior to selecting the destination thread processor, determining that the thread for which the memory accesses were monitored is a memory access intensive thread.

19. The method of claim 15, wherein running the threads on the thread processors comprises running the threads on a plurality of cores, wherein each of the cores runs one or more of the threads.

20. The method of claim 15, wherein monitoring the memory accesses comprises monitoring at least one of: (a) a proportion of instructions processed by the thread that are cache misses; and (b) a count of cycle stalls for the thread.

21. The method of claim 19, wherein determining that the thread is the memory access intensive thread comprises determining at least one of: (a) that the memory accesses of the memory access intensive thread meet a memory access threshold; and (b) that the memory accesses of the memory access intensive thread are greater than a given proportion of other threads of the plurality of threads running on the plurality of thread processors.

* * * * *

UNITED STATES PATENT AND TRADEMARK OFFICE
CERTIFICATE OF CORRECTION

PATENT NO. : 9,575,806 B2  
APPLICATION NO. : 13/538971  
DATED : February 21, 2017  
INVENTOR(S) : Ren Wang et al.

Page 1 of 1

It is certified that error appears in the above-identified patent and that said Letters Patent is hereby corrected as shown below:

On the Title Page

In item (75), in Column 1, in "Inventors", Line 2, delete "Shang Hai" and insert -- Shanghai --, therefor.

In the Drawings

On sheet 6 of 15, in Figure 6, Line 2, delete "MEMRY" and insert -- MEMORY --, therefor.

Signed and Sealed this  
Twenty-fifth Day of April, 2017

Michelle K. Lee  
*Director of the United States Patent and Trademark Office*